United States Patent
Määttanen et al.

(10) Patent No.: US 11,968,586 B2
(45) Date of Patent: Apr. 23, 2024

(54) USER EQUIPMENT, NETWORK NODE AND METHODS THEREIN FOR HANDLING A MOVING RADIO ACCESS NETWORK

(71) Applicant: Telefonaktiebolaget LM Ericsson (publ), Stockholm (SE)

(72) Inventors: Helka-Liina Määttanen, Helsinki (FI); Björn Hofström, Linköping (SE); Henrik Rydén, Solna (SE); Jonas Sedin, Sollentuna (SE); Sebastian Euler, Storvreta (SE); Talha Khan, Santa Clara, CA (US); Xingqin Lin, Santa Clara, CA (US); Zhenhua Zou, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 501 days.

(21) Appl. No.: 17/281,735

(22) PCT Filed: Oct. 3, 2019

(86) PCT No.: PCT/SE2019/050963
§ 371 (c)(1),
(2) Date: Mar. 31, 2021

(87) PCT Pub. No.: WO2020/076220
PCT Pub. Date: Apr. 16, 2020

(65) Prior Publication Data
US 2021/0400556 A1 Dec. 23, 2021

Related U.S. Application Data

(60) Provisional application No. 62/742,509, filed on Oct. 8, 2018.

(51) Int. Cl.
H04W 4/00 (2018.01)
H04W 36/30 (2009.01)
(Continued)

(52) U.S. Cl.
CPC ........... *H04W 36/32* (2013.01); *H04W 36/30* (2013.01); *H04W 84/06* (2013.01)

(58) Field of Classification Search
CPC ..... H04W 36/32; H04W 36/30; H04W 84/06; H04W 36/0085; Y02D 30/70
(Continued)

(56) References Cited

U.S. PATENT DOCUMENTS 9,749,928 B2 * 8/2017 Benammar ........... H04W 36/14
9,973,264 B2 * 5/2018 Vasavada .............. H04W 56/00
(Continued)

FOREIGN PATENT DOCUMENTS

EP 0808034 A2 11/1997
EP 0808034 A3 1/2003

OTHER PUBLICATIONS

International Search report and Written Opinion dated Dec. 11, 2019 for International Application No. PCT/SE2019/050963 filed on Oct. 3, 2019, consisting of 17-pages.
(Continued)

*Primary Examiner* — Amancio Gonzalez
(74) *Attorney, Agent, or Firm* — Weisberg I.P. Law, P.A.

(57) ABSTRACT

A network node of a wireless communication network provides information to a User Equipment (UE) that allows the UE to adapt it radio measurements with respect to the network, to account for "link changes." Link changes are service-link and/or feeder-link changes arising from motion by the satellite(s) included in the Radio Access Network (RAN) portion of the network. The UE uses the provided information to adapt its radio measurements in conjunction with the link changes. Among the several advantages of accounting for satellite link changes in the manner contemplated are any one or more of reduced signaling going between the UE and the network, reduced battery consump-
(Continued)

tion at the UE, mitigation of the effects of the link changes on the radio measurements, avoidance of spurious measurements, and an effective "automation" of the timed changeover by the UE to new measurement configurations, coincident with the occurrence of link changes.

18 Claims, 10 Drawing Sheets

(51) Int. Cl.
  *H04W 36/32* (2009.01)
  *H04W 84/06* (2009.01)
(58) Field of Classification Search
  USPC .......................................................... 370/331
  See application file for complete search history.

(56) References Cited

U.S. PATENT DOCUMENTS

| | | | | |
|---|---|---|---|---|
| 2016/0323032 | A1* | 11/2016 | Ulupinar | H04B 7/18541 |
| 2022/0052753 | A1* | 2/2022 | Speidel | H04W 16/10 |

OTHER PUBLICATIONS

3GPP TR 38.811 V15.0.0; 3rd Generation Partnership Project; Technical Specification Group Radio Access Network; Study on New Radio (NR) to support non terrestrial networks (Release 15); Jun. 2018, consisting of 118-pages.

3GPP TR 38.821 V0.1.0; 3rd Generation Partnership Project; Technical Specification Group Radio Access Network; Solutions for NR to support non terrestrial networks (NTN) (Release 16); Sep. 2018, consisting of 18-pages.

3GPP TR 38.331 V15.3.0; 3rd Generation Partnership Project; Technical Specification Group Radio Access Network; NR; Radio Resource Control (RRC) protocol specification (Release 15); Sep. 2018, consisting of 445-pages.

3GPP TSG RAN WG1 Meeting 88bis RP-171450; Title: Study on NR to support Non-Terrestrial Networks; Source: Thales, Dish Network, Hughes Network Systems, Ltd., ESA; Agenda Item: 9.1—New WI/SI proposals for New Radio; Document for: Approval; Release: Rel-15; Date and Location: Jun. 5-9, 2017, West Palm Beach, USA, consisting of 5 pages.

3GPP TSG RAN WG1 meeting #80 RP-181370; Title: Study on solutions evaluation for NR to support Non Terrestrial Network; Source: Thales; Agenda Item: 9.1.17—Study on solutions evaluation for NR to support Non Terrestrial Network, moderator: Thales; Document for: Approval; Type: SID new; Date and Location: Jun. 11-4, 2018, La Jolla, USA, consisting of 5-pages.

3GPP TSG-RAN WG3 #101bis R3-185609; Title: Parameters in NTN reference scenarios; Source: ZTE, Sanechips; Agenda Item: 20.1; Document for: Discussion and Approval; Date and Location: Oct. 8-12, 2018, Chengdu, China, consisting of 4-pages.

3GPP TSG-RAN WG2 #103bis R2-1814933; Title: Mobility aspects for NTN NR; Source: Ericsson; Agenda Item: 11.6; Document for: Discussion, Decision; Date and Location: Oct. 8-12, 2018, Chengdu, China, consisting of 5-pages.

* cited by examiner

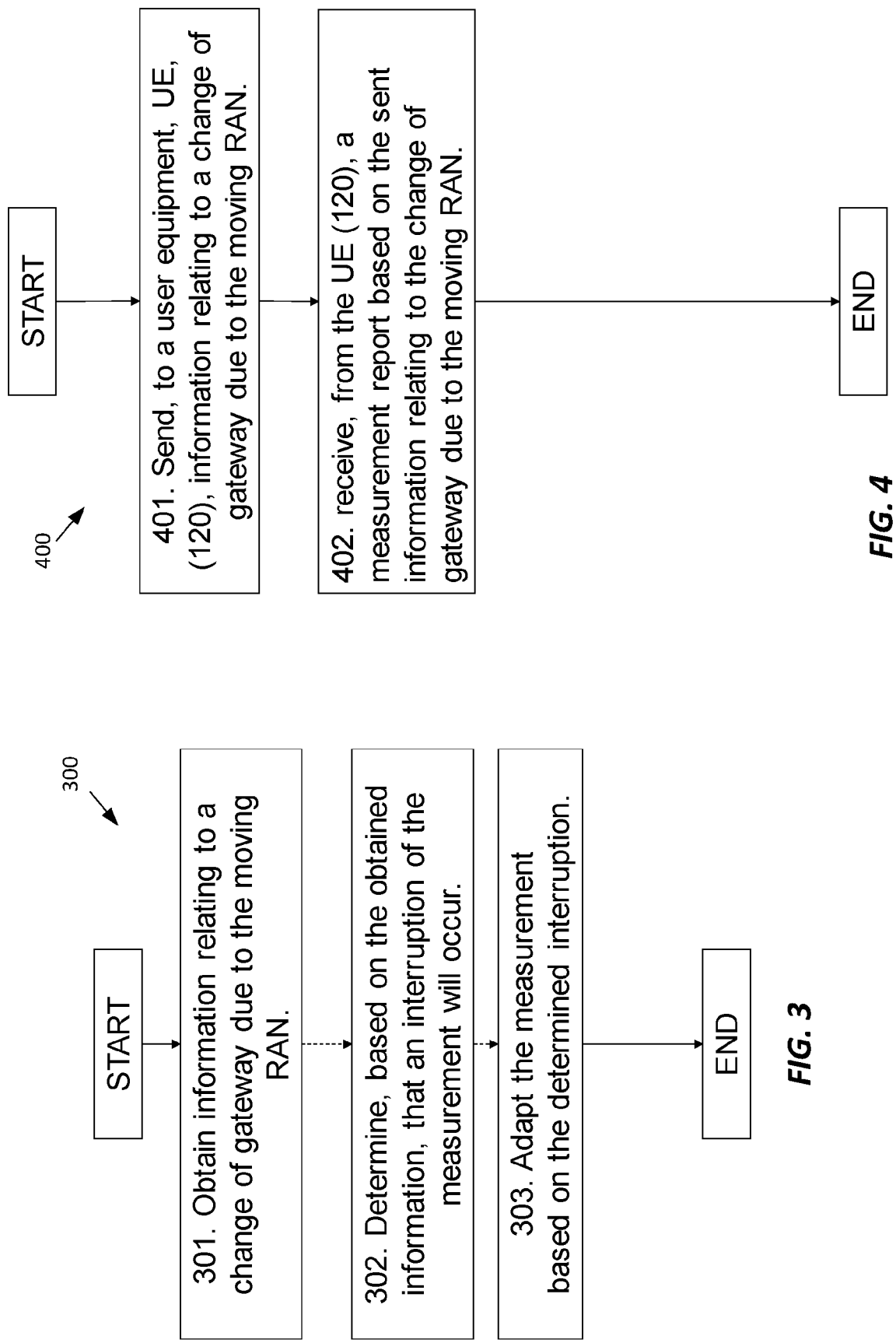

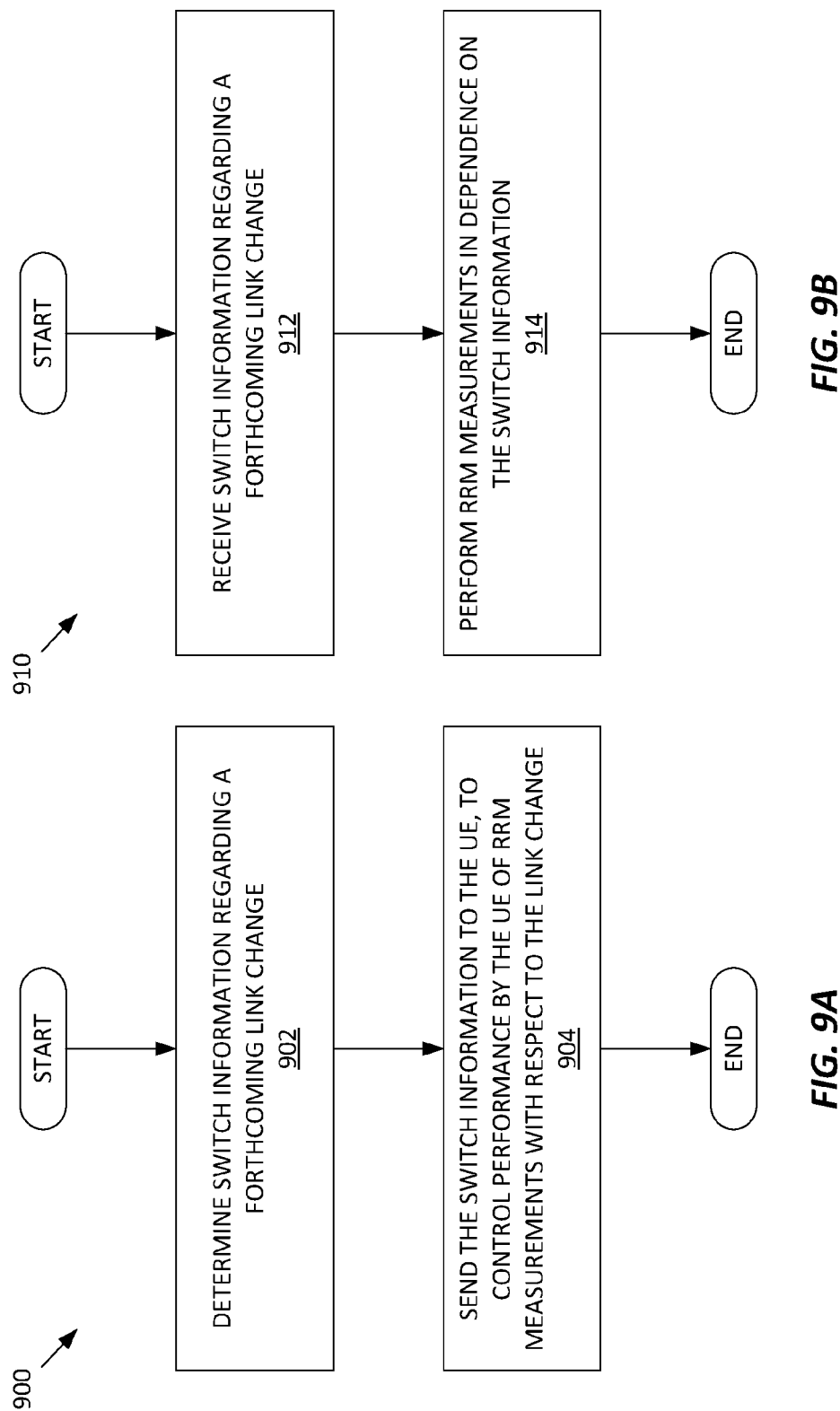

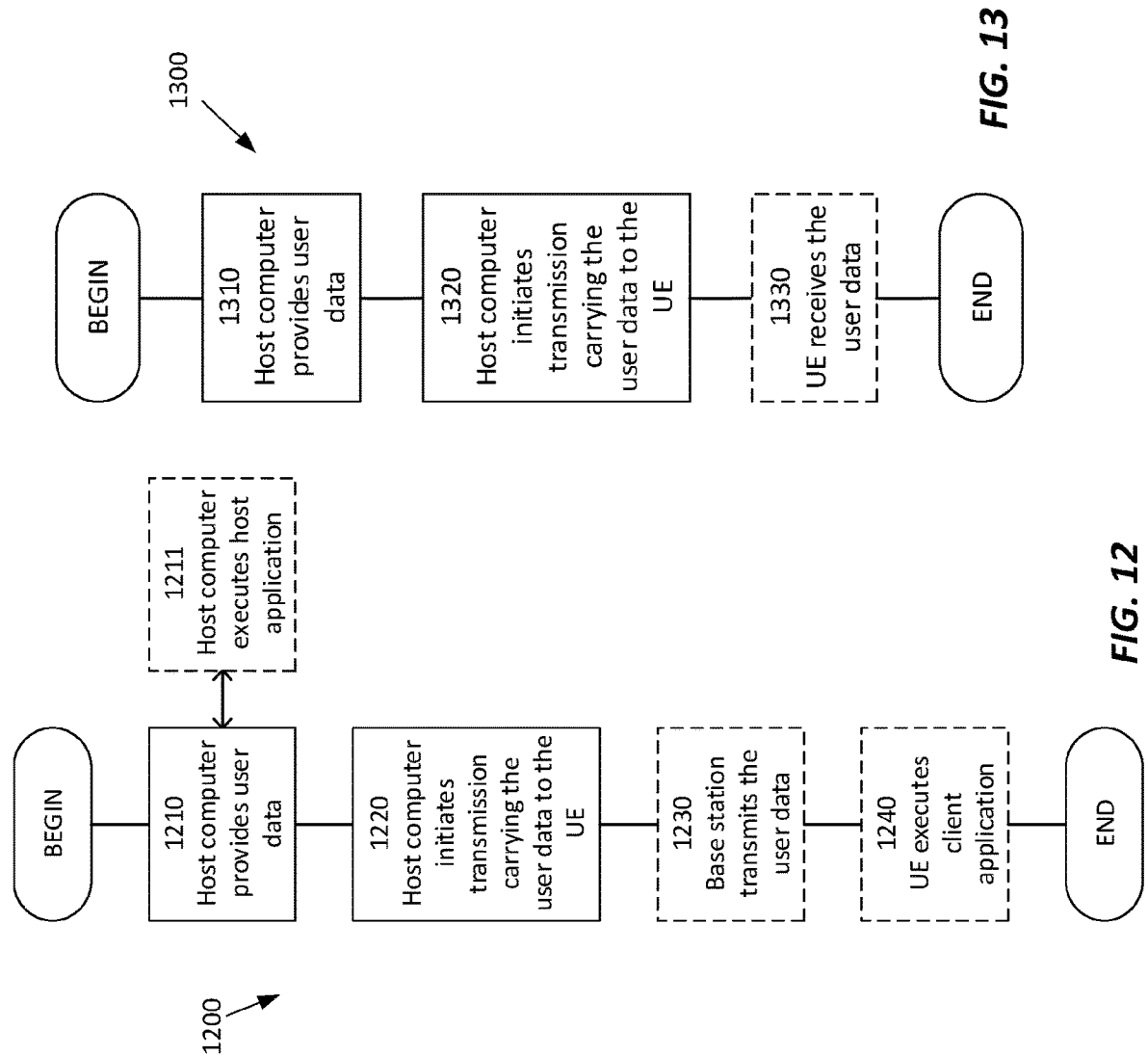

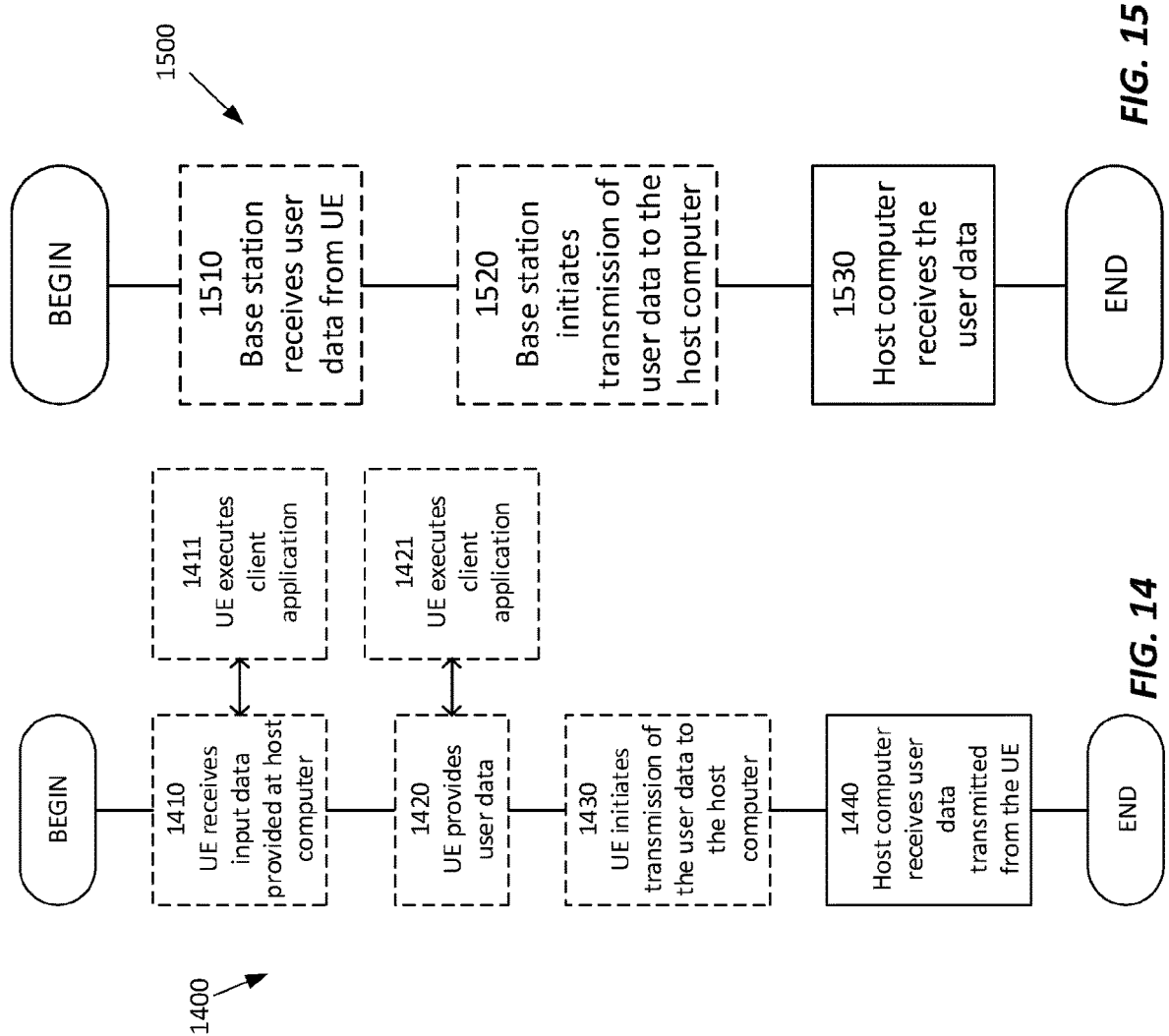

USER EQUIPMENT, NETWORK NODE AND METHODS THEREIN FOR HANDLING A MOVING RADIO ACCESS NETWORK

CROSS-REFERENCE TO RELATED APPLICATIONS

This application is a Submission Under 35 U.S.C. § 371 for U.S. National Stage Patent Application of International Application No.: PCT/SE2019/050963, filed Oct. 3, 2019 entitled "USER EQUIPMENT, NETWORK NODE AND METHODS THEREIN FOR HANDLING A MOVING RADIO ACCESS NETWORK," which claims priority to U.S. Provisional Application No.: 62/742,509, filed Oct. 8, 2018, the entireties of both of which are incorporated herein by reference.

TECHNICAL FIELD

Embodiments herein relate to a user equipment (UE), a network node and methods performed therein, for handling a moving radio access network (RAN).

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas, which may be defined in terms of "cell" areas, beams, or beam groups. A radio access node "serves" each service area, i.e., provides radio coverage over the corresponding geographic area. Examples of radio access nodes include a Wi-Fi access point or a radio base station (RBS). Radio network nodes communicate over an air interface and operate on radio frequencies, for communicating with wireless communication devices that are within range.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to Radio Network Controllers (RNCs) used in 3G networks.

Nomenclature used to describe radio base stations—radio access nodes—in cellular or other radio access networks depends on the network generation or type. In the context of radio access networks conforming to 3GPP specifications, 3G network base stations are referred to as NodeBs or NBs, 4G network base stations are referred to as eNodeBs or eNBs, and 5G network base stations are referred to as gNBs.

In general, in E-UTRAN/LTE the functions of a 3G RNC are distributed between the radio network nodes, e.g. eNodeBs in LTE or gNBs in 5G, and the CN. As such, the RAN of an EPS has an essentially "flat" architecture comprising radio network nodes connected directly to one or more CNs. That is, the radio access nodes are not connected to RNCs. To compensate for the absence of a centralized RNCs, the E-UTRAN specification defines a direct interface between the radio network nodes, denoted as the "X2" interface.

There is an ongoing resurgence of satellite communications. Several plans for satellite networks have been announced in the past few years. The target services vary, e.g., from backhaul and fixed wireless, to transportation, to outdoor mobile phone, to Internet of Things (IoT). Satellite networks may complement mobile networks on the ground by providing connectivity to underserved areas and multicast/broadcast services.

To benefit from the strong mobile ecosystem and economies of scale, adapting the terrestrial wireless access technologies including LTE and NR for satellite networks is drawing significant interest. For example, 3GPP has completed an initial study in Release 15, TR 38.811 V15.0.0, regarding the adaption of NR to support Non-Terrestrial Networks (NTN), such as satellite networks. The study focuses on the channel model for the non-terrestrial networks, defining deployment scenarios, and identifying the key potential impacts. 3GPP is conducting a follow-up study item in Release 16 on the evaluation of solutions for NR to support non-terrestrial networks, with the follow-up study referred to as RP-181370, "Study on solutions evaluation for NR to support non-terrestrial networks".

In the terrestrial context, a cell in NR is a logical concept referring, for example, to radio coverage over a certain geographic area, where the cell may be covered by multiple directional antenna beams. In the context of satellite networks, each satellite "spotbeam" may be likened to a cell, where the term spotbeam refers to the pencil of radiation emanating from a satellite and illuminating a corresponding portion of the earth's surface. While more than one spotbeam conceivably could belong to the same logical "cell," unless distinctions are needed, the terms "cell" and "spotbeam" and "beam" are used interchangeably herein, when referring to satellite-based radio coverage. However, note that certain references to "beam" are specific to the NR context, but such references are made clear.

Satellites may move rapidly with respect to the location of a UE. As an example, on a 2-hour orbit, a Low Earth Orbit (LEO) satellite is in view of a stationary UE from horizon to horizon for about 20 minutes. Since each LEO satellite may have many beams, the time during which a UE stays within a beam is typically only a few minutes. The fast pace of satellite movement creates problems for paging as well as handoffs, for both stationary and moving UEs.

Unlike terrestrial framework where a cell on the ground is tied to radio communication with a RAN, in Non-GEO satellite access network, the satellite beams may be moving. There is no fixed correspondence between cells on the ground and satellite beams. The same geographical region on the ground can be covered by different satellites and different beams over time.

Basically, when one LEO satellite's beam moves away from the geographical area, another LEO satellite's beam, which beam may be generated by the same LEO satellite or by a neighboring LEO satellite, may come in and cover the same geographical area. The new satellite may be served by the same or another sat-gateway, linking the satellite to the ground-based portion of the communication network.

From a UE perspective, satellite motion means that the ground-based gateway node changes when the sat-gateway changes. This situation is not present in regular terrestrial networks. A similar situation occurs when the serving satellite changes, even if it is connected to the same sat-gateway.

SUMMARY

A network node of a wireless communication network provides information to a User Equipment (UE) that allows the UE to adapt its radio measurements with respect to the network, to account for "link changes." Link changes are service-link and/or feeder-link changes arising from motion by the satellite(s) included in the Radio Access Network (RAN) portion of the network. The UE uses the provided information to adapt its radio measurements in conjunction with the link changes. Among the several advantages of accounting for satellite link changes in the manner contemplated are any one or more of reduced signaling going between the UE and the network, reduced battery consumption at the UE, mitigation of the effects of the link changes on the radio measurements, avoidance of spurious measurements, and an effective "automation" of the timed change-over by the UE to new measurement configurations, coincident with the occurrence of link changes.

One embodiment involves a method of operation by a network node of a wireless communication network comprising a Core Network (CN) and a satellite-based RAN for communicatively coupling UEs to the CN. The method includes determining switch information regarding a forthcoming link change with respect to providing connectivity between a UE and the CN via the satellite-based RAN. Here, the forthcoming link change is at least one of a service-link change or a feeder-link change arising from satellite movement, and the switch information indicates when the link change will occur. Correspondingly, the method includes sending the switch information to the UE, to control performance by the UE of Radio Resource Management (RRM) measurements with respect to the link change.

In a related embodiment, a network node is configured for operation in a wireless communication network that includes a CN and a satellite-based RAN for communicatively coupling UEs to the CN. The network node includes communication circuitry configured to communicatively couple the network node to a UE via the satellite-based RAN, and processing circuitry that is operatively associated with the communication circuitry. The processing circuitry is configured to determine switch information regarding a forthcoming link change with respect to providing connectivity between the UE and the CN via the satellite-based RAN, and send the switch information to the UE, to control performance by the UE of RRM measurements with respect to the link change. As before, the forthcoming link change is at least one of a service-link change or a feeder-link change arising from satellite movement, and the switch information indicates when the link change will occur.

In a further related embodiment, a network node is configured for operation in a wireless communication network that includes a CN and a satellite-based RAN for communicatively coupling UEs to the CN. The network node includes one or more processing units, including a determining unit that is configured to determine switch information regarding a forthcoming link change with respect to providing connectivity between the UE and the CN via the satellite-based RAN. Further included in the network node is a sending unit that is configured to send the switch information to the UE, to control performance by the UE of RRM measurements with respect to the link change. Again, the forthcoming link change is at least one of a service-link change or a feeder-link change arising from satellite movement, and the switch information indicates when the link change will occur.

In another embodiment, a UE performs a method of operation with respect to a wireless communication network comprising a CN and a satellite-based RAN for communicatively coupling UEs to the CN. The method includes receiving switch information from the wireless communication network, regarding a forthcoming link change with respect to providing connectivity between the UE and the CN via the satellite-based RAN. The forthcoming link change is at least one of a service-link change or a feeder-link change arising from satellite movement, and the switch information indicates when the link change will occur. Correspondingly, the method further includes performing RRM measurements in dependence on the switch information, including adapting the performance of RRM measurements at a time indicated by the switch information.

In a related embodiment, a UE is configured for operation in a wireless communication network comprising a CN and a satellite-based RAN for communicatively coupling UEs to the CN. The UE includes communication circuitry configured to send signaling to and receive signaling from the satellite-based RAN, and further includes processing circuitry that is operatively associated with the communication circuitry. The processing circuitry is configured to receive switch information from the wireless communication network, regarding a forthcoming link change with respect to providing connectivity between the UE and the CN via the satellite-based RAN, and perform RRM measurements in dependence on the switch information, including adapting the performance of RRM measurements at a time indicated by the switch information. The forthcoming link change is at least one of a service-link change or a feeder-link change arising from satellite movement, and the switch information indicates when the link change will occur.

In a further related embodiment, a UE is configured for operation in a wireless communication network comprising a CN and a satellite-based RAN for communicatively coupling UEs to the CN. The UE includes one or more processing units, including a receiving unit configured to receive switch information from the wireless communication network, regarding a forthcoming link change with respect to providing connectivity between the UE and the CN via the satellite-based RAN. The forthcoming link change is at least one of a service-link change or a feeder-link change arising from satellite movement, and the switch information indicates when the link change will occur. Correspondingly, the one or more processing units further include an adapting unit that is configured to perform RRM measurements in dependence on the switch information, including adapting the performance of RRM measurements at a time indicated by the switch information.

The various example embodiments disclosed herein provide several mechanisms for mitigating the problems related to RRM measurements by a UE, in the case of a switch of the serving satellite, satellite beam, and/or ground gateway. The embodiments account for any such changes, along with accounting for, for example, changes in "neighbors" associated with a switch, e.g., neighboring beams, etc. Certain aspects of the various embodiments may have particular relevance in dependence on the network deployment scenario or type of link change in question.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 is a logic flow diagram of one embodiment of a method of operation by a User Equipment (UE).

FIG. 4 is a logic flow diagram of one embodiment of a method of operation by a network node.

FIGS. 9A and 9B are logic flow diagrams of example methods of operation by a network node and a UE, respectively.

FIGS. 12-15 are logic flow diagrams of example methods of operation by or between a UE, a base station, and a host computer, such as seen in FIG. 11.

DETAILED DESCRIPTION

In the following, the problems and solutions according to the embodiments disclosed herein are described using NR terminology. It should however be understood that the same solutions apply to other types or generations of communication networks, such as LTE.

Figures 1A, 1B:
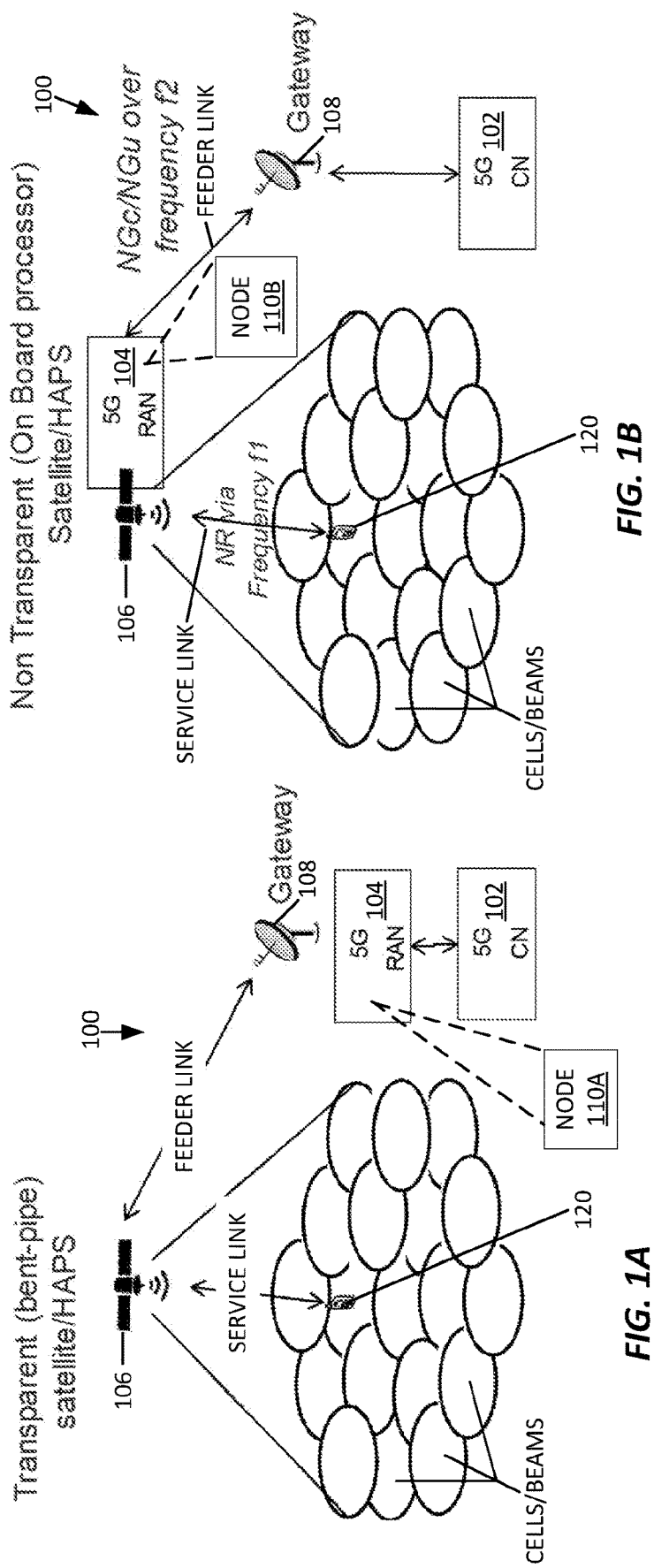
FIG. 1A is a diagram of a communication network according to one embodiment.
FIG. 1B is a diagram of a communication network according to another embodiment.

FIG. 1A discloses an example architecture of a wireless communication network 100, which includes a Core Network (CN) 102, a Radio Access Network (RAN) 104, one or more ground-to-satellite gateways 108, and a satellite network comprising one or more satellites 106 that provide radio access for communicatively coupling User Equipments (UEs) 120 to the wireless communication network 100 (hereafter "network 100"). Note that for simplicity, FIG. 1A depicts a single satellite 106, a single gateway 108, and a single UE 120. However, it shall be understood that the RAN 104 may include or otherwise use multiple satellites 106, that there may be multiple gateways 108 in distributed geographic locations, and that there may be any number of UEs 120 operating in or attempting to connect with the network 100, through multiple, different ones of the satellites 106. Also, note that the satellite(s) 106 could be high-altitude pseudo satellites, denoted as "HAPS" in the diagram.

In particular, the arrangement depicted in FIG. 1A involves "bent-pipe" satellite transponders on the satellites 106. In a bent-pipe arrangement, the individual satellites 106 forward received radio signals back to the earth with only amplification and a frequency shift. Satellites 106 operating in the bent-pipe arrangement may be referred to as "transparent" satellites. FIG. 1B illustrates an alternative to the bent-pipe implementation at issue in. In FIG. 1B, the satellites 106 carry regenerative transponders that have on-board processors, to demodulate and decode received radio signals and regenerate them, for retransmission to the earth. Satellites 106 that use regeneration as just described may be referred to as "non-transparent" satellites. See the use of frequency f1 in the New Radio (NR) based service link between the UE 120 and the satellite 106 in FIG. 1B, and see the Next Generation Core (NGc) and Next Generation User-Plane (NGu) signaling carried on the feeder link in FIG. 1B, using frequency f2.

While the RAN 104 in both FIGS. 1A and 1B are satellite-based RANs in that they both use satellites 106 as radio access points for providing service to UEs 120, the distribution or arrangement of supporting nodes in the RAN and certain aspects of the various links or connections may change. However, in both cases, the radio connection between a given UE 120 and its serving satellite 106 may be referred to as a "service link" and the radio connection between the satellite 106 and its serving or supporting gateway 108 may be referred to as a "feeder link." Even for stationary UEs 120, satellite motion means that a UE 120 may experience one or more link changes during the course of service, such as one or more service link changes in which the UE 120 changes to a new serving satellite beam and/or new serving satellite 106, and one or more feeder link changes in which the satellite 106 serving the UE 120 changes earth stations (gateways 108).

Depending on the orbit altitude, a given satellite 106 may be categorized as a low Earth orbit (LEO) satellite, a medium Earth orbit (MEO) satellite, or geostationary orbit (GEO) satellite. LEO heights typically range from 250-1, 500 km, with orbital periods ranging from 90-130 minutes. MEO heights typically range from 5,000-25,000 km, with orbital periods ranging from 2-14 hours. GEO heights are at about 35,786 km, with an orbital period of 24 hours.

Each satellite 106 may be configured to generate several beams over a given area. The footprint of a beam is usually in an elliptic shape, which has traditionally been considered and/or referred to as a "cell". The footprint of the beam is also often referred to as a spotbeam. The footprint of the beam may move over the earth surface with the satellite movement or may be earth-fixed by means of a beam pointing mechanism used by the satellite 106 to compensate for its motion. The size of a spotbeam depends on the system design and may range from tens of kilometers to a few thousand of kilometers.

FIGS. 1A and 1B show an example architecture of a satellite network with bent-pipe transponders, including example depictions of cells/beams provided over a terrestrial geographic area, for serving one or more UEs 120. Again, the satellites 106 may function as bent-pipe transponders (transparent satellites), or may perform onboard signal reception, demodulation, and regeneration (regenerative satellites).

In RAN#80, a new Study Item (SI), "Solutions for NR to support Non-Terrestrial Network", was agreed—see RP-181370, Study on solutions evaluation for NR to support non-terrestrial networks. The study continues from a preceding SI, "NR to support Non-Terrestrial Networks" (RP-171450), which studied the channel model for the non-terrestrial networks, to define deployment scenarios and parameters, and identify the key potential impacts on NR. The results are reflected in TR 38.811 V15.0.0.

The objectives of the current SI (RP-181370) are to evaluate solutions for the identified key impacts from the preceding SI and to study impact on RAN protocols/architecture. The objectives for layer 2 and above include studying propagation delay, including with respect to Frequency Division Duplexing and Time Division Duplexing modes of operation, and timing requirements and solutions regarding Medium Access Control (MAC), Radio Link Control (RLC), and Radio Resource Control (RRC) operations. Radio link management is also implicated, including studying and identifying mobility requirements and necessary measurements that may be needed for handovers between some non-terrestrial space-borne vehicles, such as e.g., Non Geo stationary satellites, that move at much higher speed but over predictable paths. Further aspects of study relating to radio link management include identifying needs for the 5G Radio Access Network architecture to support non-terrestrial networks, such as e.g. handling of network identities, along with evaluation of paging procedure adaptations in case of moving satellite footprints or cells.

The coverage pattern of Non-Terrestrial Networks (NTNs) is described in TR 38.811 V15.0.0 in Section 4.6 as follows:

Satellite or aerial vehicles typically generate several beams over a given area. The footprint of the beams are typically elliptic shape.

The beam footprint may be moving over the earth with the satellite or the aerial vehicle motion on its orbit. Alternatively, the beam foot print may be earth fixed, in such case some beam pointing mechanisms (mechanical or electronic steering feature) will compensate for the satellite or the aerial vehicle motion.

Typical beam patterns of various NTN access networks are depicted in FIG. 1:

The Technical Report (TR) of the ongoing SI, TR 38.821 V0.1.0, describes scenarios for the NTN work as follows:

Non-Terrestrial Network typically features the following elements:
- One or several sat-gateways that connect the Non-Terrestrial Network to a public data network
- a GEO satellite is fed by one or several sat-gateways which are deployed across the satellite targeted coverage (e.g. regional or even continental coverage). An assumption is that a UE in a cell is served by only one sat-gateway
- A Non-GEO satellite served successively by one sat-gateway at a time. The system ensures service and feeder link continuity between the successive serving sat-gateways with sufficient time duration to proceed with mobility anchoring and hand-over Four scenarios are considered and are detailed in Table 4.2-1 of TR 38.821 V0.1.0, while Table 4.2-2 sets out relevant parameters, as shown below.

TABLE 4.6-1

Typical beam footprint size

| Attributes | GEO | Non-GEO | Aerial |
|---|---|---|---|
| Beam foot print size in diameter | 200-1000 km | 100-500 km | 5-200 km |

TABLE 4.2-1

Reference scenarios

| | Transparent satellite | Regenerative satellite |
|---|---|---|
| GEO based non-terrestrial access network | Scenario A | Scenario B |
| LEO based non-terrestrial access network | Scenario C | Scenario D |

TABLE 4.2-2

Reference scenario parameters

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Max channel bandwidth (service link) | 30 MHz for band <6 GHz<br>400 MHz for band >6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes |
| Earth-fixed beams | Yes | Scenario C: No (the beams move with the satellite)<br>Scenario D, option 1: Yes (steering beams), see note 1<br>Scenario D, option 2: No (the beams move with the satellite) |
| Max beam foot print diameter at nadir | 500 km | 200 km |
| Min Elevation angle for both sat-gateway and user equipment | 10° | 10° |

TABLE 4.2-2-continued

Reference scenario parameters

| Scenarios | GEO based non-terrestrial access network (Scenario A and B) | LEO based non-terrestrial access network (Scenario C & D) |
|---|---|---|
| Max distance between satellite and user equipment at min elevation angle | 40,586 km | 1,932 km (600 km altitude) 3,131 km (1,200 km altitude) |
| Max Round Trip Delay (propagation delay only) | Scenario A: 562 ms (service and feeder links) Scenario B: 281 ms | Scenario C: 25.76 ms (transparent payload: service and feeder links) Scenario D: 12.88 ms (regenerative payload: service link only) |
| Max delay variation within a beam (earth fixed user equipment) | 16 ms | 4.44 ms (600 km) 6.44 ms (1200 km) |
| Max differential delay within a beam | 1.6 ms | 0.65 ms (*) |
| Max Doppler shift (earth fixed user equipment) | 0.93 ppm | 24 ppm (*) |
| Max Doppler shift variation (earth fixed user equipment) | 0.000 045 ppm/s | 0.27 ppm/s (*) |
| User equipment motion on the earth | 1000 km/h (e.g. aircraft) | 500 km/h (e.g. high speed train) Possibly 1000 km/h (e.g. aircraft) |
| User equipment antenna types | Omnidirectional antenna (linear polarization), assuming 0 dBi Directive antenna (up to 60 cm equivalent aperture diameter in circular polarization) | |
| User equipment Tx power | Omnidirectional antenna: UE power class 3 with up to 200 mW Directive antenna: up to 4 W | |
| User equipment Noise figure | Omnidirectional antenna: 7 dB Directive antenna: 1.2 dB | |
| Service link | 3 GPP defined New Radio | |
| Feeder link | 3 GPP or non-3GPP defined Radio interface | 3 GPP or non-3GPP defined Radio interface |

Each satellite 106 may have the capability to steer beams towards fixed points on earth using beamforming techniques. This is applicable for a period of time corresponding to the visibility time of the satellite 106. Further, maximum (Max) delay variation within a beam (earth fixed user equipment) may be calculated based on Minimum (Min) Elevation angle for both given gateways 108 and given UEs 120. Also, the max differential delay within a beam may be calculated based on the max beam footprint diameter at nadir.

For "scenario D", which is LEO with regenerative payload, both earth-fixed and earth moving beams have been listed. So, when factoring the scenarios in fixed/non-fixed beams, an additional scenario may be provided. The complete list of 5 scenarios in TR 38.821 V0.1.0 is then: Scenario A-GEO, transparent satellite, Earth-fixed beams; Scenario B-GEO, regenerative satellite, Earth fixed beams; Scenario C-LEO, transparent satellite, Earth-moving beams; Scenario D1—LEO, regenerative satellite, Earth-fixed beams; and Scenario D2—LEO, regenerative satellite, Earth-moving beams.

When NR or LTE is applied to provide the connectivity via respective ones of the satellites 106 included in the network 100, the ground station is a RAN node. In the case where the satellite 106 is transparent, all RAN functionalities are on the ground which means the gateway 108 has base station (e.g., eNB/gNB) functionality. For the regenerative satellite payload, part or all, of the eNB/gNB processing may be performed by the satellite 106. Of particular interest herein is the operation of a RAN node 110A as shown in the transparent-scenario of FIG. 1A, or a RAN node 110B as shown in the regenerative-scenario of FIG. 1B. Although the RAN node 110A is ground-based in an example transparent-satellite scenario and is satellite-based in an example regenerative-satellite scenario, the features and operations of interest are substantially the same, and references to a "RAN node 110" without the "A" or "B" suffixing refers to one or both the RAN node 110A and the RAN node 110B.

In a non-geo arrangement, the satellites 106 move rapidly with respect to the location of any given UE 120. As an example, on a 2-hour orbit, a LEO satellite is in view of a stationary UE 120 from horizon to horizon for about 20 minutes. Since each LEO satellite may have many beams, the time during which a UE stays within a beam is typically only a few minutes. The fast pace of satellite movement creates problems for paging as well as handoffs for the UE, and these problems apply whether the UE 120 is stationary or moving.

Unlike a terrestrial framework where a cell on the ground is tied to radio communication with a RAN, in a Non-GEO implementation of the satellites 106, the satellite beams may be moving. There is no fixed correspondence between cells on the ground and satellite beams. The same geographical region on the ground can be covered by different satellites 106 and different beams over time.

Basically, when the beam of one LEO satellite 106 moves away from a given geographical area, another beam from the same satellite 106 or from another satellite 106 may come in and cover the same geographical area. The involved satellite 106 may be served by the same or another gateway 108.

From a UE perspective, this fact means that the supporting ground connection changes when the gateway 108 changes. Such situations are not present in regular terrestrial networks. A similar situation occurs when the serving satellite 106 of a UE changes, even if the new serving satellite 106 is connected to the same gateway 108.

As for the types of UEs 120 that may be served by the network 100, it should be appreciated that a broad range of UE types and communication services may be involved. However, expectations include UEs 120 operating in rural areas. As an example, stationary UEs 120, such as those associated with rooftop satellite antennas. Slow-moving UEs 120 represent another example type or scenario, such as UEs 120 carried on ships moving at slow to moderate speeds. In yet another example, one or more of the UEs 120 may be moving at high-speeds, such as the case where the UE(s) 120 are carried onboard a high-speed train. With these scenarios in mind, the contemplated network 100 advantageously handles "normal" mobility scenarios as known for terrestrial networks, as well as the additional "mobility" scenarios arising from the movement of the satellites 106 used as radio access points of the satellite-based RAN 104.

Key aspects addressed by the network 100 involve radio measurements performed by the UEs 120. For terrestrial NR, Section 5.5.1 of TS 38.331 V15.3.0 explains that a network may configure an RRC_CONNECTED UE to perform measurements and report them in accordance with a measurement configuration. The measurement configuration is provided by means of dedicated signaling, i.e., using the RRCReconfiguration message. The network 100 may, according to the specifications, configure a UE 120 to perform the following types of measurements: NR measurements, and inter-Radio Access Technology (RAT) measurements of E-UTRA frequencies.

The network 100 may configure a UE 120 to report the following measurement information based on Synchronization Signal (SS) block(s) and/or Physical Broadcast Channel (PBCH) block(s); measurement results per SS/PBCH block; measurement results per cell based on SS/PBCH block(s); or SS/PBCH block(s) indexes.

The network 100 may configure a UE 120 to report the following measurement information based on Channel State Information-Reference Signals (CSI-RS) resources: measurement results per CSI-RS resource; measurement results per cell based on CSI-RS resource(s); or CSI-RS resource measurement identifiers.

A measurement configuration may include a Measurement Object (MO), which is a list of objects on which the UE 120 shall perform the measurements. For intra-frequency and inter-frequency measurements, a measurement object indicates the frequency/time location and subcarrier spacing of reference signals to be measured. Associated with this measurement object, the network 100 may configure a list of cell specific offsets, a list of "blacklisted" cells and a list of "whitelisted" cells. Blacklisted cells are not applicable in event evaluation or measurement reporting. Whitelisted cells are the only ones applicable in event evaluation or measurement reporting.

The measurement configuration may further include the measObjectId of the MO which corresponds to each serving cell, and which is indicated by servingCellMO within the serving cell configuration. For inter-RAT E-UTRA measurements, a measurement object is a single E-UTRA carrier frequency. Associated with this E-UTRA carrier frequency, the network 100 can configure a list of cell specific offsets, a list of "blacklisted" cells and a list of "whitelisted" cells. Blacklisted cells are not applicable in event evaluation or measurement reporting. Whitelisted cells are the only ones applicable in event evaluation or measurement reporting.

The measurement configuration also may define one or more reporting configurations, such as by including a list of reporting configurations, where there can be one or multiple reporting configurations per measurement object. Each reporting configuration includes a reporting criterion that triggers the UE 120 to send a measurement report, with reporting being periodical or single-event reporting. The reporting configuration also specifies the Reference Signal (RS) type that the UE 120 uses for radio measurements (beam and cell measurements), such as specifying that the UE 120 is to use Synchronization Signal/Physical Broadcast Channel (SS/PBCH) blocks for its radio measurements or Channel State Information (CSI) RS.

Further, the reporting configuration specifies a reporting format. The reporting format governs the quantities per cell and per "beam" in the NR sense of beams, that the UE 120 includes in the measurement report (e.g. RSRP) and other associated information. Such other information may be the maximum number of cells and the maximum number of beams in the NR sense that are formed by SS/PBCH or CSI-RS per cell to report. The meaning of "beam" in the NR context is defined by controlling 5G/NR specifications. The relationship between "beams" in the NR sense and satellite spotbeams is an implementation detail.

Other items included in the measurement object include measurement identifies, such as a list of measurement identities, where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network 100.

Further, the measurement configuration may include quantity configurations, where a quantity configuration defines the measurement filtering configuration used for all event evaluation and related reporting, and for periodical reporting of that measurement. For NR measurements, the network 100 may configure up to two quantity configurations with a reference in the NR measurement object to the configuration that is to be used. In each configuration, different filter coefficients can be configured for different measurement quantities, for different RS types, and for measurements per cell and per beam.

Still further, the measurement configuration may specify measurement gaps. Measurement gaps are periods without scheduled uplink (UL) or downlink (DL) transmissions targeting a UE 120, and thus serve as windows during which the UE 120 can use its receiver circuitry for performing the configured radio measurements.

A UE 120 in RRC_CONNECTED mode maintains a measurement object list, a reporting configuration list, and a measurement identities list according to signaling and procedures in this specification. The measurement object list may include NR object(s) and inter-RAT objects. Similarly, the reporting configuration list may include NR and inter-RAT reporting configurations. Any measurement object may be linked to any reporting configuration of the same RAT type. Some reporting configurations may not be linked to a measurement object. Likewise, some measurement objects may not be linked to a reporting configuration.

Measurement procedures distinguish between different "types" of cells in the network, such as serving cells, listed cells, and detected cells. Serving cells are associated with providing communication service to the UE 120 and NR serving cells are referred as the SpCell and one or more SCells. Listed cells are those listed within the measurement object(s), while detected cells are those that are not listed within the measurement object(s) but are detected by the UE on the SSB frequency/frequencies and subcarrier spacing(s) indicated by the measurement object(s). As noted earlier herein, the various references to network "cells" may be understood as equivalently referring to the satellite beams—spotbeams—provided by one or more satellites 106 in the satellite-based RAN 104 of the network 100. For NR measurement object(s), a UE 120 may measure and report on the serving cell(s), listed cells and/or detected cells. For inter-RAT measurements object(s) of E-UTRA, the UE 120 may measure and report on listed cells and detected cells.

In the non-limiting example context of the foregoing measurement configurations set out in TS 38.331 V15.3.0, the network 100 provides mechanisms for adapting or otherwise controlling the radio measurements made by a UE 120 with respect to serving and/or non-serving satellite beams, from one or more of the satellites 106 included in the satellite-based RAN 104. In particular, the network 100 provides information to respective UEs 120 that accounts for upcoming link changes arising from satellite motion, where a "link change" refers to a change in the feeder link and/or the service link included in the overall connection between a UE 120 and the network 100. Among the various advantages of the disclosed mechanism are reduced signaling arising from ground-station changes—i.e., changes in the feeder link where the feeder link used for a given UE 120 changes from one gateway 108 to another gateway 108.

According to a first scenario, a UE 120 is being served by a given satellite 106 and motion of the satellite 106 requires it to change the feeder link from one ground station to another—from one gateway 108 to another gateway 108. See FIG. 2, for example.

Figure 2:
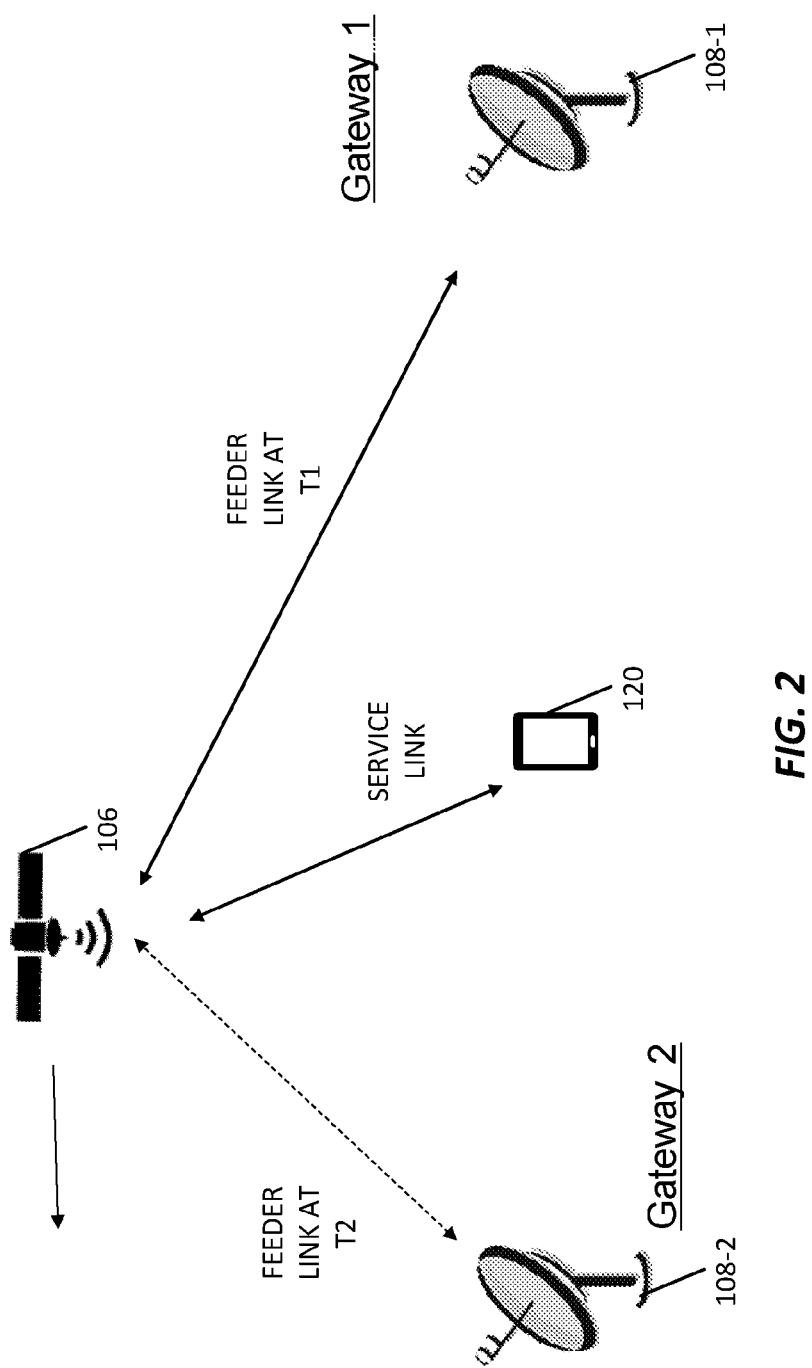
FIG. 2 is a diagram of selected details for the communication network of FIGS. 1A or 1B.

FIG. 2 illustrates a given satellite 106 operating as a non-geo satellite. The satellite 106 serves a given UE 120, meaning that there is a service link between the UE 120 and the satellite 106. At time T1, a first gateway 108-1 anchors the service link between the satellite 106 and the ground portion of the network 100. As the satellite 106 moves, its feeder link changes at time T2 from the first gateway 108-1 to a second gateway 108-2. Thus, while the service link of the UE 120 does not change, the feeder link does change. Several issues arise in relation to the ground station switch—the change in which gateway 108 supports the feeder link. Such changes may preserve the Physical Cell Identity (PCI) of the first gateway 108-1.

One issue is that there may be an idle period of the satellite transmission, when the satellite 106 switches its connection from the first gateway 108-1 to the second gateway 108-2. For Radio Resource Management (RRM) measurements by the UE 120, the switchover affects the serving cell of the UE 120, along with the neighboring cells. The neighboring cell(s) switch may occur at the same time as the serving cell if they are served by the same gateway 108-1, or at different time instances if they are using different gateways. In particular, at least in a transparent service scenario, the satellite beam being used to serve a UE 120 and any neighboring beams provided by the same satellite 106 will be affected when the satellite 106 changes its ground-station connection.

In another scenario, the satellite 106 being used to serve a given geographic area changes, e.g., because the satellite 106 begins disappearing over the horizon. The satellite 106 newly coming into position to serve the area in question may use the same ground station as the prior satellite 106, or may use a different ground station (gateway 108). Thus, this scenario involves changes in the service link of the UE 120, along with possible changes in the feeder link of the UE 120. Of course, a given UE 120 may experience service link changes with respect to its currently-serving satellite 106, especially in scenarios where the satellite 106 does not use beam steering to maintain the coverage areas of its beams/cells as the satellite 106 moves. That is, the UE 120 may have to change from beam-to-beam as its serving satellite 106 moves.

The embodiments described herein provide methods for configuring RRM measurements, to take into account changes in the service link and/or feeder link of a UE, with such changes arising from satellite motion. For example, various embodiments introduce signaling options to support RRM measurements by a UE, in the event of service and/or feeder link changes. Example advantages of the disclosed mechanisms include but are not limited to any one or more of the following: (a) mitigation of the effects of the link change(s), based on signaling switch information to the involved UE 120; (b) avoiding spurious or inaccurate radio measurements by the UE 120; and (c) reducing battery consumption at the UE 120, e.g., by avoiding measurements during a link change.

The embodiments herein provide several methods for mitigating the problems related to RRM measurements in conjunction with link changes in the connection between a UE 120 and the network 100.

For UEs 120 that are operating in a "connected mode," such as UEs 120 that are in an RRC Connected Mode, the UEs 120 may be provided with measurement configuration information that accounts for impending link changes. The measurement configuration may comprise information on when a MO or a measurement ID is valid. There may be a set of MOs/MeasIDs (measurement identifiers) valid before a given time or after a given time. For example, if there are two measIDs with the same MO but different report configurations, a report configuration may be valid before the switch and after the switch.

With example reference again to TS 38.331 V15.3.0, the information to account for a link change may be included within the information comprising MO/reportconfig/quantityconfig items. For example, a MO included in the measurement configuration determined for a UE 120 include information related to the switch, which may herein be referred to as "switch information". The "switch information" may include details for when the link change(s) will happen/occur.

For example, the switch information determined by the network 100—e.g., by a network node 110 within the network 100—indicates the time of an upcoming link change in terms of absolute time, such as GPS time, UTC time, etc. Additionally, or alternatively, the switch information indicates the time of an upcoming link change as a relative time value. Examples of relative expressions of time include system frame timings corresponding to the beginning and/or end of the switch. Relative time parameters include, for example, system frame number, slot number, OFDM symbol, etc. In any case, the switch information may indicate the duration of the switch in absolute or relative time.

The information also may include velocity information and/or other parameters. For example, the information provided by the network 100 to a UE 120 includes, in one or more embodiments, information in an expected path loss change. For example, in case of a bent-pipe payload (transparent satellite operation), the path loss between the UE 120 and the supporting gateway 108 includes the path loss of the service link between the UE 120 and the supporting satellite 106 and the path loss of the feeder link between the satellite 106 and the gateway 108. Thus, the path loss changes when the satellite 106 changes from one gateway 108 to another and apprising the UE 120 of the expected change in path loss associated with an upcoming feeder link change allows the UE 120 to account for the change. For example, the UE 120 may coordinate an increase or decrease in its transmit power to coincide with the changeover to the new gateway 108, to account for the corresponding change in path loss. Such operation allows the UE 120 to account for a large increase in path loss, for example, that occurs when its serving satellite 106 changes to another gateway 108.

The "switch information" or path loss change information (described above), may be given: for all cells in a frequency pointed to in the measurement object, and/or for a list of cells (list of PCIs), and/or for an individual PCI, and/or for SS block (SSB) beam information/index for a PCI, and/or for a serving cell (PCI of serving cell) in case of a serving cell MO, and/or for a location, to tell the UE 120 the exact location or area where the "switch information" is valid.

The quantity configuration provided by the network 100 as part of or in conjunction with the switch information may comprise updated quantity configuration comprising a relevant measurement filtering configuration which the UE 120 shall apply during and following the switch. That is, the information may comprise filter coefficients to be used for different measurement quantities, Reference Signal (RS) types, at the cell or beam level. Additionally, or alternatively, information included in or sent in conjunction with the switch information may include any one or more of: an indication that the UE 120 shall not measure any signals during the switch; and an indication of whether or not the UE 120 is to combine filtered measurements before and after the switch.

To the extent that the switch information includes or is sent with information indicating a (measurement) report configuration, such information may comprise any one or more of the following: different parameter values to be applied before and after switch, such as e.g. threshold values., an indication of whether to report on a switch occasion of a cell or not. That is, the UE 120 in at least one embodiment may be configured to include a flag in reported measurement results, indicating that the results have been affected by a link change, or at least indicating that the measurement results correspond to a time that spans or includes a link change. A measurement triggering condition also may be defined, based on the delay between the UE 120 and the supporting ground node in the network 100. For example, the triggering condition may be set as an absolute threshold where if the physical propagation delay of the measured cell is larger or smaller than an absolute threshold, the UE 120 may send a measurement report. In another embodiment, or in another operating scenario, the triggering condition is set as a relative threshold, where the UE 120 sends a measurement report in dependence on whether the difference in delay between a serving cell and a measured non-serving cell is larger than a threshold.

The above information for serving cell reference value derivation and definition for beam or cell quality may be provided in a measID related to the serving cell or in a serving cell dedicated configuration.

As for UEs 120 operating in an idle mode, some or all of the information detailed above for connected-mode UEs 120 may be provided, e.g., in System Information (SI) broadcasted within a beam or cell. For example, the SI may provide information specific to cells, on SS/PBCH beams on a serving cell, on neighbor cells on same frequency, or on neighbor cells on a neighbor carrier, or indicating neighbor-carrier SSB locations/cells.

For both idle-mode and connected-mode UEs 120, the switch information or information provided in conjunction with the switch information may include a predefined switch-list. The list indicates, for example, information about the expected switches in service links and/or feeder links, given the geographical location of a UE 120, e.g., based on known patterns of satellite motion and corresponding link changes. As an example, the network 100 may store information that indicates the particular beam, satellite 106, and gateway 108 that are associated with a particular geographic area for a given time-of-day. Therefore, to minimize RRC signaling in the downlink for a connected-mode UE 120, and to minimize location-area update signaling for an idle mode UE 120, the network 100 may be configured to provide information to a UE 120 regarding when a specific spotbeam would cover the geographical area and, more generally, with information about time instances at which the UE 120 operating in that area may expect link changes. Such information may be provided in Non-Access Stratum (NAS) signaling, or otherwise provided as subscription information.

Behavior by a UE 120 with respect to indicated link changes may be fixed in the relevant controlling specifications, for example. In example, a UE 120 shall stop Layer 1 (L1) and/or Layer 3 (L3) filtering of a beam or cell quality, when the measurement configuration indicates that there will be an interruption, such as due to a link change. In the same or another example, a UE 120 shall discard filtered measurements, if the filtering period was shorter than a configured or fixed time. In a further example, a UE 120 shall combine certain beam or cell level filtering according to the measurement configuration. The particular behavior taken by the UE 120 may be configured via the switch information or other information associated therewith, such as overall "measurement configuration information" that is sent by the network 100 to a UE 120, to configure the UE 120 so that it accounts for one more upcoming link changes in its RRM measurements. Notably, the particular mechanism by which the network 100 configures a UE 120 to adapt its RRM measurements to account for a link change may vary, in dependence on the nature of the change, for example.

FIG. 3 illustrates one embodiment of a method 300 of processing carried out by an example UE 120, for handling measurements, such as e.g. Radio Resource Control (RRC) and/or Radio Resource Management (RRM) measurements, with respect to a satellite-based RAN 104.

Action 301: The UE 120 may obtain information from a network node 110 relating to a forthcoming link change due to satellite motion e.g., a feeder link change. The information relating to the link change may comprise switch information indicating when the link change will occur, and/or information on an expected path loss change due to the link change. Additionally, or alternatively, the UE 120 may be provided with a quantity configuration or a report configuration, indicating how and when the UE 120 shall report measurements to the network 100. Additionally, or alternatively, the switch information may comprise a predefined switch-list indicating when a specific link change will occur.

Action 302: The UE 120 may determine, based on the obtained information, that an interruption of its measurements will occur.

Action 303: The UE 120 may adapt its measurement, such as e.g. Radio Resource Control (RRC) and/or Radio Resource Management (RRM) measurements, based on the determined interruption. The UE 120 may adapt the measurement by stopping Layer 1 (L1) and/or Layer 3 (L3) filtering of a beam or a cell quality based on the determination that an interruption will occur, such as due to a feeder link change. This step may be performed by an adapting unit and/or a filtering unit comprised in the UE 120. The UE 120 may adapt the measurement by discarding filtered measurements if the filtering period is shorter than a configured or fixed time. This step may be performed by an adapting unit and/or a discarding unit comprised in the UE 120. The UE 120 may adapt the measurement by combining beam or cell level filtering according to the obtained information, such as e.g. a measurement configuration. This step may be performed by an adapting unit and/or a combining unit comprised in the UE 120.

FIG. 4 illustrates one embodiment of a method 400 of operation performed by a network node 110, for adapting the measurement activities of a UE 120 with respect to link changes arising as a consequence of satellite motion in the satellite-based RAN 104 that is used to communicatively couple the UE 120 with the network 100.

Action 401: The network node 110 may send, to a user equipment, UE 120 information relating to an upcoming link change, e.g., a feeder link change where the serving satellite 106 of the UE 120 changes from one gateway 108 to another gateway 108.

The information relating to the link change may comprise any one or more of: switch information indicating when the change will occur, information on an expected path loss change associated with the link change, a quantity configuration, a report configuration, or switch information comprising a predefined list of link changes expected for the current location of the UE 120. Here, the quantity configuration or report configuration, as described earlier herein, indicates how and when the UE 120 shall report measurements to the network 100. Further, the "location" of the UE 120 as regards the predetermined list of expected link changes means the location of the UE 120 as it relates to which satellites 106 and/or satellite beams provide service for the geographic location of the UE 120 and at what times or over what intervals, along with any feeder link changes that are expected to occur during those intervals.

Action 402: The network node 110 may receive, from the UE 120, a measurement report that is based on the adaptation(s) made by the UE 120 in accordance with the information provided to the UE 120 by the network 100 regarding the link change(s).

Figure 5:
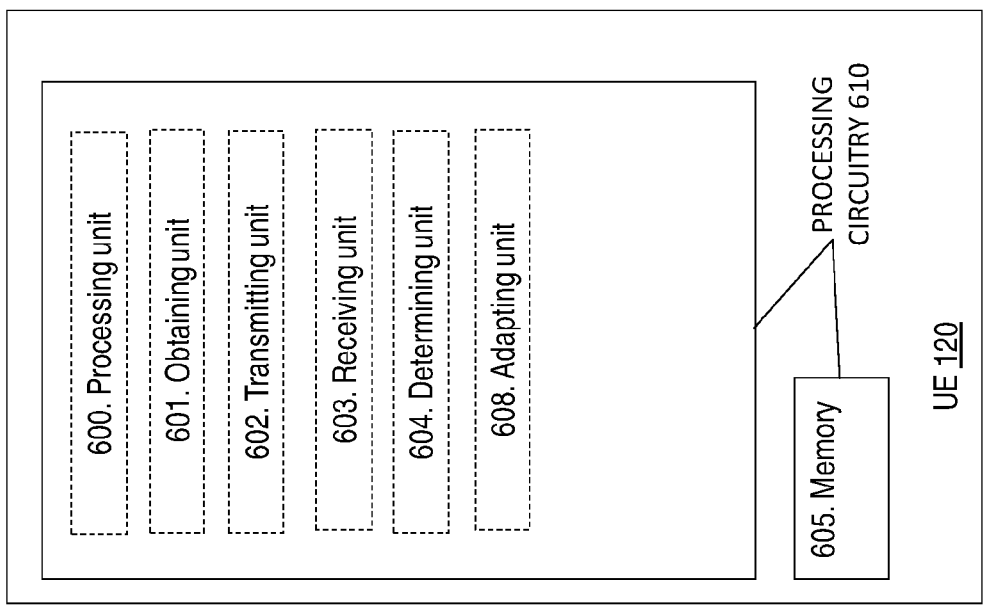

FIG. 5 is a block diagram depicting the UE 120, for handling measurements that account for link changes arising from satellite motion in a satellite-based RAN 104 used to coupling the UE 120 to the network 100.

The UE 120 in the example embodiment comprises a number of functional units or processing modules, including a processing unit 600 that includes or is associated with an obtaining unit 601, a transmitting unit 602, a receiving unit 603, a determining unit 604, and an adapting unit 608, as exemplifying hardware units configured to carry out the UE-side operations described herein for a UE 120. Collectively, the underlying processing hardware with its corresponding functional configurations may be referred to as processing circuitry 610. In one or more examples, the processing circuitry 610 is configured according to its execution of stored computer program instructions held in a memory 605.

Figure 6:
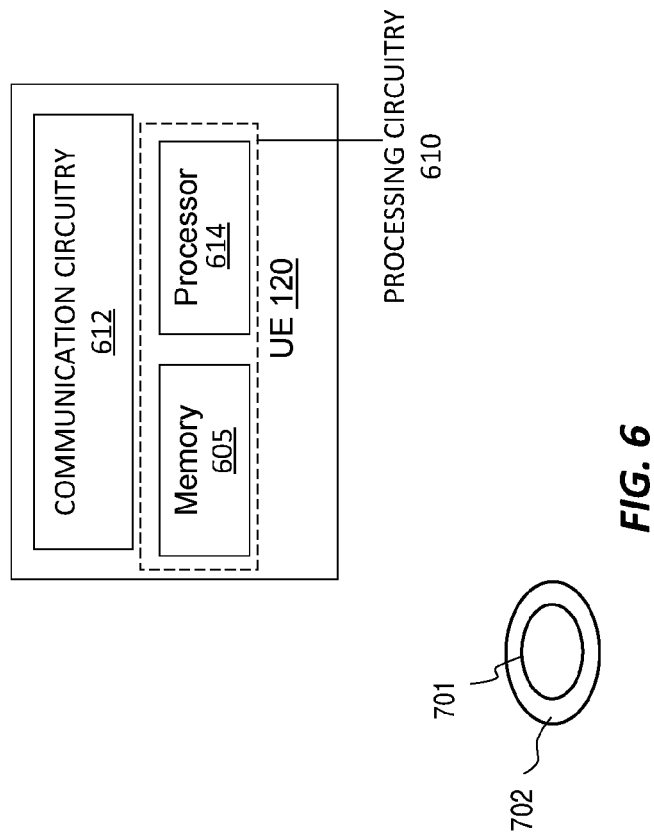
FIGS. 5 and 6 are block diagrams of example details of a UE, according to respective embodiments.

For example, see FIG. 6, depicting an overall circuitry arrangement for the UE 120 in an example embodiment, wherein the processing circuitry 610 comprises one or more processors 614, along with the associated memory 605, and communication circuitry 612 comprising the radio interface circuitry used by the UE 120 for transmitting uplink signals to and receiving downlink signals from the satellite-based RAN 104.

The various UE embodiments may be performed by the processor(s) 614 together with respective computer program code stored in the memory 605, for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc.

Correspondingly, FIG. 6 depicts a computer-readable medium 702 storing a computer program product 701. It is however feasible with other data carriers such as e.g. a memory stick. The computer program code may furthermore be provided as pure program code on a server and downloaded to the UE 120. The storage medium 702 may be a non-transitory computer-readable storage medium and may, in one or more embodiments comprise at least a portion of the memory 605. The computer program may also be comprised on a carrier, wherein the carrier is one of an electronic signal, optical signal, radio signal, or a computer readable storage medium.

In addition to providing program storage, the memory 605 may comprise one or more memory units to be used to store data on, such as the PUSCH resource table, software, patches, system information (SI), configurations, diagnostic data, performance data and/or applications to perform the methods disclosed herein when being executed, and similar.

The processing circuitry 610 may be implemented using digital logic and/or one or more microcontrollers, microprocessors, or other digital hardware. In some embodiments, several or all of the various functions performed by the processing circuitry 610 may be implemented together, such as in a single application-specific integrated circuit (ASIC), or in two or more separate devices with appropriate hardware and/or software interfaces between them. Several of the functions may be implemented on a processor shared with other functional components of a UE 120.

Alternatively, several of the functional elements of the processing circuitry 610 may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included.

Designers of network nodes or devices will appreciate the cost, performance, and maintenance trade-offs inherent in these design choices.

Figure 7:
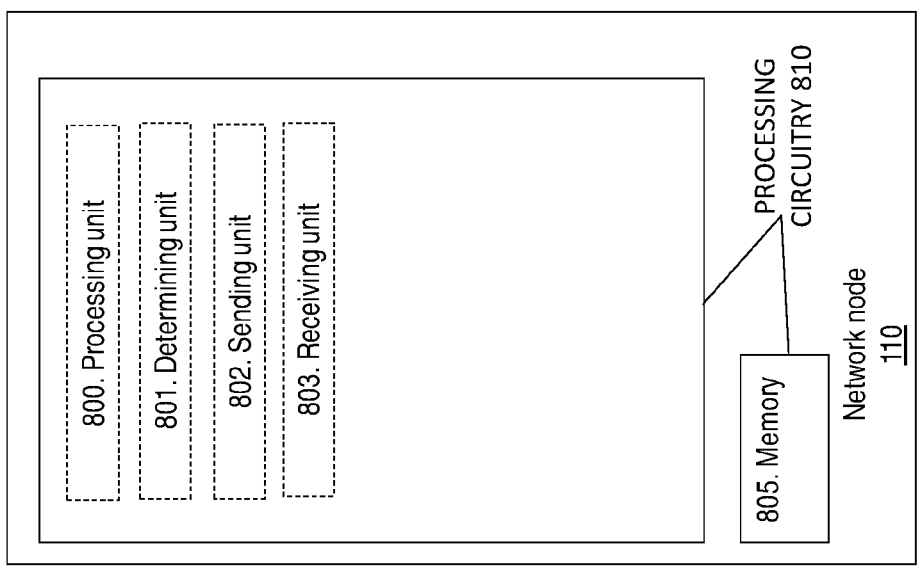

FIG. 7 is a block diagram depicting the network node 110 according to an example embodiment. As noted, the network node 110 may operate as a radio base station in the network 100, such as an eNB in a 4G LTE context, or as a gNB in a 5G NR context. The network node 110 of FIG. 7 provides example implementation details for either one of the network nodes 110A and 110B introduced in FIGS. 1A and 1B.

In the illustrated example, the network node 110 comprises a number of functional units or processing modules, including a processing unit 800 that includes or is associated with a determining unit 801, a sending unit 802, and a receiving unit 803. For example, determining unit 801 determines switch information and/or other information for providing to a UE 120, to allow the UE 120 to make radio-measurement adaptations with respect to link changes and the sending and receiving units 802 and 803 are configured for communicating with the UE 120 directly or indirectly, via the satellite-based RAN 104.

Collectively, the underlying processing hardware with its corresponding functional configurations may be referred to as processing circuitry 810. In one or more examples, the processing circuitry 810 is configured according to its execution of stored computer program instructions held in a memory 805.

Figure 8:
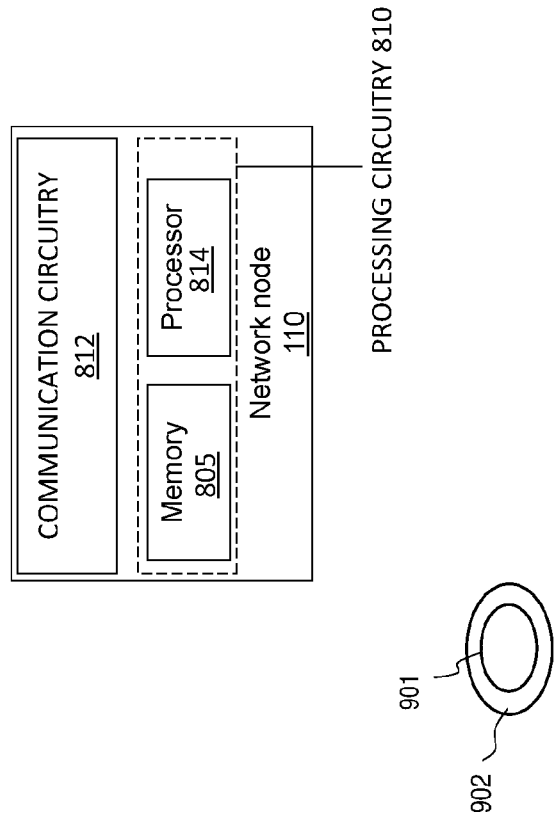
FIGS. 7 and 8 are block diagrams of example details of a network node, according to respective embodiments.

For example, see FIG. 8, depicting an overall circuitry arrangement for the network node 110 in an example embodiment, wherein the processing circuitry 810 comprises one or more processors 814, along with the associated memory 805, and communication circuitry 812. The particular implementation of the communication circuitry 812 may depend on whether the network node 110 is ground-based (see FIG. 1A) or satellite-based (see FIG. 1B). However, the communication circuitry 812 is configured for communicating directly or indirectly with UEs 120 that are served by the satellite-based RAN 104.

The various network-node operations described herein may be implemented by the processor(s) 814 together with respective computer program code stored in the memory 805. In at least one implementation, the memory 805 stores computer program instructions that, when executed by the one or more processors 814 of the processing circuitry 810, configure the network node 110 to carry out the operations described herein. The computer program instructions may be provided as a computer program product, for instance in the form of a data carrier carrying computer program code for performing the embodiments herein when being loaded into the UE 120. One such carrier may be in the form of a CD ROM disc or other computer-readable medium 902 storing a computer program 901.

The computer program code may furthermore be provided as pure program code on a server and downloaded to the node 110. The storage medium 902 may be a non-transitory computer-readable storage medium and may, in one or more embodiments comprise at least a portion of the memory 805. The computer program may also be comprised on a carrier, wherein the carrier is one of an electronic signal, optical signal, radio signal, or a computer readable storage medium.

In addition to providing program storage, the memory 805 may comprise one or more memory units to be used to store data on, such as the PUSCH resource table, software, patches, system information (SI), configurations, diagnostic data, performance data and/or applications to perform the methods disclosed herein when being executed, and similar.

The processing circuitry 810 may be implemented using digital logic and/or one or more microcontrollers, microprocessors, or other digital hardware. In some embodiments, several or all of the various functions performed by the processing circuitry 810 may be implemented together, such as in a single application-specific integrated circuit (ASIC), or in two or more separate devices with appropriate hardware and/or software interfaces between them. Several of the functions may be implemented on a processor shared with other functional components of a UE 120.

Alternatively, several of the functional elements of the processing circuitry 810 may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

Further, the network node 110 in one or more embodiments is implemented in a cloud, e.g., in a data center. As a further variation, the network node 110 may be implemented as a core network node, e.g., implemented in the CN 102 depicted in FIGS. 1A and 1B. Still further, as an alternative to one or more embodiments wherein the network node 110 is realized as a centralized node, e.g., in a cloud environment, the functionality attributed herein to the network node 110 is implemented in a distributed fashion, in one or more embodiments. When a plurality of nodes is collocated in one node, the single node may be configured to perform the actions of each of the collocated nodes.

FIG. 9A illustrates another embodiment of a method 900 of operation by a network node 110 of a wireless communication network 100 that comprises a CN 102 and a satellite-based RAN 104 for communicatively coupling UEs 120 to the CN 102. The method 900 includes the network node 110 determining (Block 902) switch information regarding a forthcoming link change with respect to providing connectivity between a UE 120 and the CN (102) via the satellite-based RAN 104. The forthcoming link change is at least one of a service-link change or a feeder-link change arising from satellite movement, and the switch information indicates when the link change will occur.

In one or more embodiments or example scenarios, the network node 110 determines the switch information based on its one processing, although in one or more other embodiments or examples, the network node 110 receives all or some of the switch information from another node in the network 100. In any case, the switch information may be calculated or otherwise predicted or extrapolated from satellite ephemeris data and/or historical data that characterizes the coverage times and/or changes in satellite coverage for the current geographic location of the UE 120. Additionally, in at least some embodiments, the network node 110 accounts for motion of the UE 120, if any. For example, the network 100 may track movement of the UE 120 and predict its continued line of travel based on historic speed and direction and/or use known route information, such as for UEs 120 carried on trains or other vehicles with fixed routes and known speeds.

Regardless of how the network node 110 determines the switch information, the method 900 includes the network node 110 sending (Block 904) the switch information to the UE 120, to control performance by the UE 120 of RRM measurements with respect to the link change.

In an example scenario, the UE 120 has a current measurement configuration that is valid until the link change and governs the performance of RRM measurements by the UE 120 in advance of the link change. The method 900 includes sending a new measurement configuration in or in conjunction with the switch information, the new measurement configuration being valid after the link change and governing the performance of RRM measurements by the UE 120 after the link change. The new measurement configuration includes, for example, one or more measurement objects and one or more measurement object identifiers corresponding to one or more service links applicable to the UE 120 after the link change.

In at least one implementation example, or in at least one operational scenario, the switch information indicates that the UE 120 shall suspend the performance of RRM measurements during an interval in which the link change occurs. Additionally, or alternatively, the switch information indicates a measurement filtering configuration to be used by the UE 120 for the performance of RRM measurements after the link change. Additionally, or alternatively, the switch information indicates whether the UE 120 shall combine RRM measurements acquired by the UE 120 in advance of the link change with RRM measurements acquired by the UE 120 after the link change. Additionally, or alternatively, the switch information indicates when the link change will occur using an absolute time value or a relative time value. In at least one embodiment, when the relative time value is used, the relative time value is expressed in terms of a system frame timing used for synchronous transmission to and reception from the UE 120.

The satellite-based RAN 104 comprises a number of satellite-based transponders 106 operative for relaying radio signals between the UE 120 and one or more ground-based radio access nodes 110B. Where the link change comprises a feeder-link change for a satellite-based transponder 106 that is currently serving the UE 120, the method 900 includes sending, in or in conjunction with the switch information, information indicating an expected change in path loss associated with the feeder-link change.

With the method 900 in mind, in one or more embodiments, a network node 110 is configured for operation in a wireless communication network 100 comprising a CN 102 and a satellite-based RAN 104 for communicatively coupling UEs to the CN 102. The network node 110 includes communication circuitry 812 that is configured to communicatively couple the network node 110 to a UE 120 via the satellite-based RAN 104. For example, the communication circuitry 812 includes satellite-radio circuitry for supporting the service-link between the UE 120 and the serving satellite 106 carrying the network node 110. In another example, the communication circuitry 812 is configured to communicate indirectly with the UE 120, using the radio-link coupling provided by the serving satellite 106 and its supporting gateway 108.

The network node 110 further includes processing circuitry 810 that is operatively associated with the communication circuitry 812 and configured to determine switch information regarding a forthcoming link change with respect to providing connectivity between the UE 120 and the CN 102 via the satellite-based RAN 104. The forthcoming link change is at least one of a service-link change or a feeder-link change arising from satellite movement, and the switch information indicates when the link change will occur. Correspondingly, the processing circuitry 810 is configured to send the switch information to the UE 120, to control performance by the UE 120 of RRM measurements with respect to the link change.

In an example scenario, the UE 120 has a current measurement configuration that is valid until the link change and governs the performance of RRM measurements by the UE 120 in advance of the link change. For example, the network node 110 previously provided the UE 120 with measurement configuration information tailored to the service/feeder links and neighboring beams or cells applicable for operation of the UE 120 in the satellite-based RAN 104 in advance of an upcoming link change. Correspondingly, the processing circuitry 810 is configured to send a new measurement configuration in or in conjunction with the switch information, the new measurement configuration being valid after the link change and governing the performance of RRM measurements by the UE 120 after the link change.

For example, the new measurement configuration includes one or more measurement objects and one or more measurement object identifiers corresponding to one or more service links applicable to the UE 120 after the link change. And, as noted before, the switch information may comprise one or more types of information or information elements. For example, the switch information indicates that the UE 120 shall suspend the performance of RRM measurements during an interval in which the link change occurs. Additionally, or alternatively, the switch information indicates a measurement filtering configuration to be used by the UE 120 for the performance of RRM measurements after the link change. Additionally, or alternatively, the switch information indicates whether the UE (120) shall combine RRM measurements acquired by the UE 120 in advance of the link change with RRM measurements acquired by the UE 120 after the link change. Additionally, or alternatively, the switch information indicates when the link change will occur using an absolute time value or a relative time value. When the relative time value is used, the relative time value is expressed, for example, in terms of a system frame timing used for synchronous transmission to and reception from the UE 120.

In at least one example configuration or scenario, the satellite-based RAN 104 comprises a number of satellites 106—also referred to as satellite transponders—that are operative to relay radio signals between the UE 120 and one or more ground-based radio access nodes 110B, and an upcoming link change for the UE 120 comprises a feeder-link change for a satellite-based transponder 106 that is currently serving the UE 120. For such circumstances, the processing circuitry 810 is configured to send, in or in conjunction with the switch information, information indicating an expected change in path loss associated with the feeder-link change. The path-loss information allows the UE 120 to adapt its transmit power level(s), to account for the changes in path loss that occur in conjunction with the link change.

In another embodiment of the contemplated network node 110, whether implemented as a node 110A in FIG. 1A or as a node 110B in FIG. 1B, the network node 110 comprises one or more processing units 800—see FIG. 7. The one or more processing units 800 include a determining unit 801 that is configured to determine switch information regarding a forthcoming link change with respect to providing connectivity between the UE 120 and the CN 102 via the satellite-based RAN 104, the forthcoming link change being at least one of a service-link change or a feeder-link change arising from satellite movement, and the switch information indicating when the link change will occur. The network node 110 further includes a sending unit 802 that is configured to send the switch information to the UE 120, to control performance by the UE 120 of RRM measurements with respect to the link change.

Turning to complementary operations carried out by an example UE 120, FIG. 9B illustrates a method 910 of operation by a UE 120 with respect to a wireless communication network 100 that includes a CN 102 and a satellite-based RAN 104 for communicatively coupling UEs to the CN 102. The method 910 includes the UE 120 receiving (Block 912) switch information from the wireless communication network 100, regarding a forthcoming link change with respect to providing connectivity between the UE 120 and the CN 102 via the satellite-based RAN. Here, the forthcoming link change is at least one of a service-link change or a feeder-link change arising from satellite movement and the switch information indicates when the link change will occur, and the method 910 further includes the UE 120 performing (Block 914) RRM measurements in dependence on the switch information, including adapting the performance of RRM measurements at a time indicated by the switch information.

The UE 120 "adapting the performance of RRM measurements" at the time indicated by the switch information means that the UE 120 changes its measurement behavior to account for the link change. For example, the UE 120 changes from a current measurement configuration to a new measurement configuration at the time indicated by the switch information, wherein the current measurement configuration governs performance of RRM measurements by the UE 120 in advance of the link change, and wherein the new measurement configuration governs performance of RRM measurements by the UE 120 after the link change. The new measurement configuration includes, for example, one or more measurement objects and one or more measurement object identifiers corresponding to one or more service links applicable to the UE 120 after the link change.

The switch information in at least one embodiment or in at least one operational scenario indicates that the UE 120 shall suspend the performance of RRM measurements during an interval in which the link change occurs. Correspondingly, the UE 120 adapting the performance of RRM measurements at the time indicated by the switch information comprises the UE 120 suspending the performance of RRM measurements during the interval. Additionally, or alternatively, the switch information indicates a measurement filtering configuration to be used by the UE 120 for the performance of RRM measurements after the link change, and adapting the performance of RRM measurements at the time indicated by the switch information comprises the UE 120 adapting measurement filtering used by the UE 120 for filtering RRM measurements, in accordance with the measurement filtering configuration indicated by the switch information. Additionally, or alternatively, the switch information indicates whether the UE 120 shall combine RRM measurements acquired by the UE 120 in advance of the link change with RRM measurements acquired by the UE 120 after the link change, and adapting the performance of RRM measurements at the time indicated by the switch information includes, in dependence on the switch information, the UE 120 combining or not combining RRM measurements made in advance of the time indicated by the switch information with RRM measurements made after the time indicated by the switch information.

As noted, the switch information may indicate when the link change will occur using an absolute time value or a relative time value. When the relative time value is used, the relative time value is expressed in terms of a system frame timing used for synchronous transmission to and reception from the UE 120.

In an example embodiment or in at least one operating scenario, the satellite-based RAN 104 comprises a number of satellite-based transponders 106 operative for relaying radio signals between the UE 120 and one or more ground-based radio access nodes 110. Here, the "relaying" operation can be understood as the bent-pipe or transparent mode of satellite operation described in the background herein. Correspondingly, the link change comprises a feeder-link change for a satellite-based transponder 106 that is currently serving the UE 120. The method 910 advantageously includes the UE 120 receiving, in or in conjunction with the switch information, information indicating an expected change in path loss associated with the feeder-link change, and, correspondingly, the UE 120 adjusting a power of one or more uplink transmissions by the UE 120, to account for the expected change in path loss.

With reference back to FIGS. 5 and 6, a UE 120 in one or more embodiments is configured for operation in a wireless communication network 100 comprising a CN 102 and a satellite-based RAN 104 that is operative to communicatively couple UEs to the CN 102. The UE 120 includes communication circuitry 612 configured to send signaling to and receive signaling from the satellite-based RAN 104.

The UE 120 further includes processing circuitry 610 that is operatively associated with the communication circuitry 612 and configured to receive switch information from the network 100, regarding a forthcoming link change with respect to providing connectivity between the UE 120 and the CN 102 via the satellite-based RAN 104. The forthcoming link change is at least one of a service-link change or a feeder-link change arising from satellite movement, and the switch information indicates when the link change will occur. Correspondingly, the processing circuitry 610 is configured to perform RRM measurements in dependence on the switch information, including adapting the performance of RRM measurements at a time indicated by the switch information.

As an example of adapting the performance of RRM measurements at the time indicated by the switch information, the processing circuitry 610 is configured to change from a current measurement configuration to a new measurement configuration at the time indicated by the switch information. In this example, a current measurement configuration governs performance of RRM measurements by the UE 120 in advance of the link change, and the new measurement configuration governs performance of RRM measurements by the UE 120 after the link change. The new measurement configuration includes one or more measurement objects and one or more measurement object identifiers corresponding to one or more service links applicable to the UE 120 after the link change. See, for example, details in Section 5 of TS 38.331 V15.3.0, regarding measurement configurations, including measurement objects and measurement object identifiers.

In at least one embodiment, or in at least one example scenario, the switch information indicates that the UE 120 shall suspend the performance of RRM measurements during an interval in which the link change occurs. Here, to adapt the performance of RRM measurements at the time indicated by the switch information, the processing circuitry 610 is configured to suspend the performance of RRM measurements during the interval. Additionally, or alternatively, the switch information indicates a measurement filtering configuration to be used by the UE 120 for the performance of RRM measurements after the link change. In such a case, to adapt the performance of RRM measurements at the time indicated by the switch information, the processing circuitry 610 is configured to adapt measurement filtering used by the UE 120 for filtering RRM measurements, in accordance with the measurement filtering configuration indicated by the switch information. Additionally, or alternatively, the switch information indicates whether the UE 120 shall combine RRM measurements acquired by the UE 120 in advance of the link change with RRM measurements acquired by the UE 120 after the link change. In such a case, to adapt the performance of RRM measurements at the time indicated by the switch information, the processing circuitry 610 is configured to combine or not combine RRM measurements made in advance of the time indicated by the switch information with RRM measurements made after the time indicated by the switch information, in dependence on the switch information.

Also, as previously noted, the switch information may indicate when the link change will occur using an absolute time value or a relative time value. When the relative time value is used, the relative time value is expressed in terms of a system frame timing used for synchronous transmission to and reception from the UE 120. Such an expression may use System Frame Numbers (SFNs), subframe numbers or positions, timeslots, or other indexing into the time structure used for signal transmission/reception.

In an example where the satellite transponders 106 operate in a transparent mode, and where the link change comprises a feeder-link change—i.e., a change in the ground connection of the satellite transponder 106 that is serving the UE 120, the network 100 in one or more embodiments is configured to include with the switch information, information indicating an expected change in path loss associated with the feeder-link change. Correspondingly, in such embodiments, the processing circuitry 610 is configured to receive the information indicating the expected change in path loss associated with the feeder-link change, and, adjust a power of one or more uplink transmissions by the UE, to account for the expected change in path loss.

In another example embodiment, and with reference particularly to FIG. 5, the UE 120 may be realized as one or more functional processing modules or units. For example, the UE 120 in at least one embodiment comprises one or more processing units 600, including a receiving unit 603 configured to receive switch information from the network 100, regarding a forthcoming link change with respect to providing connectivity between the UE 120 and the CN 102 via the satellite-based RAN 104. The forthcoming link change is at least one of a service-link change or a feeder-link change arising from satellite movement, and the switch information indicating when the link change will occur. The UE 120 further includes an adapting unit 608 configured to perform Radio Resource Management (RRM) measurements in dependence on the switch information, including adapting the performance of RRM measurements at a time indicated by the switch information.

With the above examples in mind, in one embodiment, a UE 120 performs a method that includes the UE 120 obtaining information relating to a change of gateways 108 due to satellite motion in the satellite-based RAN 104, the UE 120 determining, based on the obtained information, that an interruption of its RRM measurements will occur, and the UE 120 adapting its RRM measurements based on the determined interruption. The obtained information comprises switch information indicating when the change of gateways 108 will occur, and/or information on an expected path loss change due to the change of gateways 108, and/or a quantity configuration, and/or a report configuration indicating how/when the UE 120 shall report measurements to the RAN, and/or a predefined switch-list indicating when a specific change of gateways 108 will occur.

Adapting its RRM measurements means, for example, stopping Layer 1 (L1) and/or Layer 3 (L3) filtering of a beam or a cell quality, based on the determination that an interruption will occur, such as e.g., a change in gateways 108. Additionally, or alternatively, adapting the measurements comprises the UE 120 discarding filtered measurements, if the filtering period is shorter than a configured or fixed time. Additionally, or alternatively, adapting the measurement comprises the UE 120 combining beam or cell level filtering according to the obtained information, such as e.g., a measurement configuration. As noted before, the information used by the UE 120 to determine how and when to adapt its RRM measurements may be provided by a network node 110, with the information ultimately being provided to the UE 120 via its reception of downlink signaling transmitted to the UE 120 from a serving one of the satellites 106 in the satellite-based RAN 104.

In complementary operations, such a network node 110 carries out a method that includes the network node 110 sending information to a UE 120, with the information relating to a change of gateways 108 due to the satellite motion in the satellite-based RAN 104 that is used by the network 100 for the radio connection to the UE 120. The network node 110 sends the information directly, e.g., in a case where it is onboard the satellite 106 that is serving the UE 120, or indirectly, e.g., in a case where it is a ground-based node that sends the information to the serving satellite (or another node coupled thereto) for subsequent transmission of the information on the satellite downlink to the UE 120. In any case, the method further includes the network node 110 receiving, from the UE 120, a measurement report based on the sent information relating to the change of gateways 108. In an example case, the network node 110 adapts is processing of the reported measurements in dependence on its knowledge of the measurement adaptations made by the UE 120 with respect to the gateway change.

Figure 10:
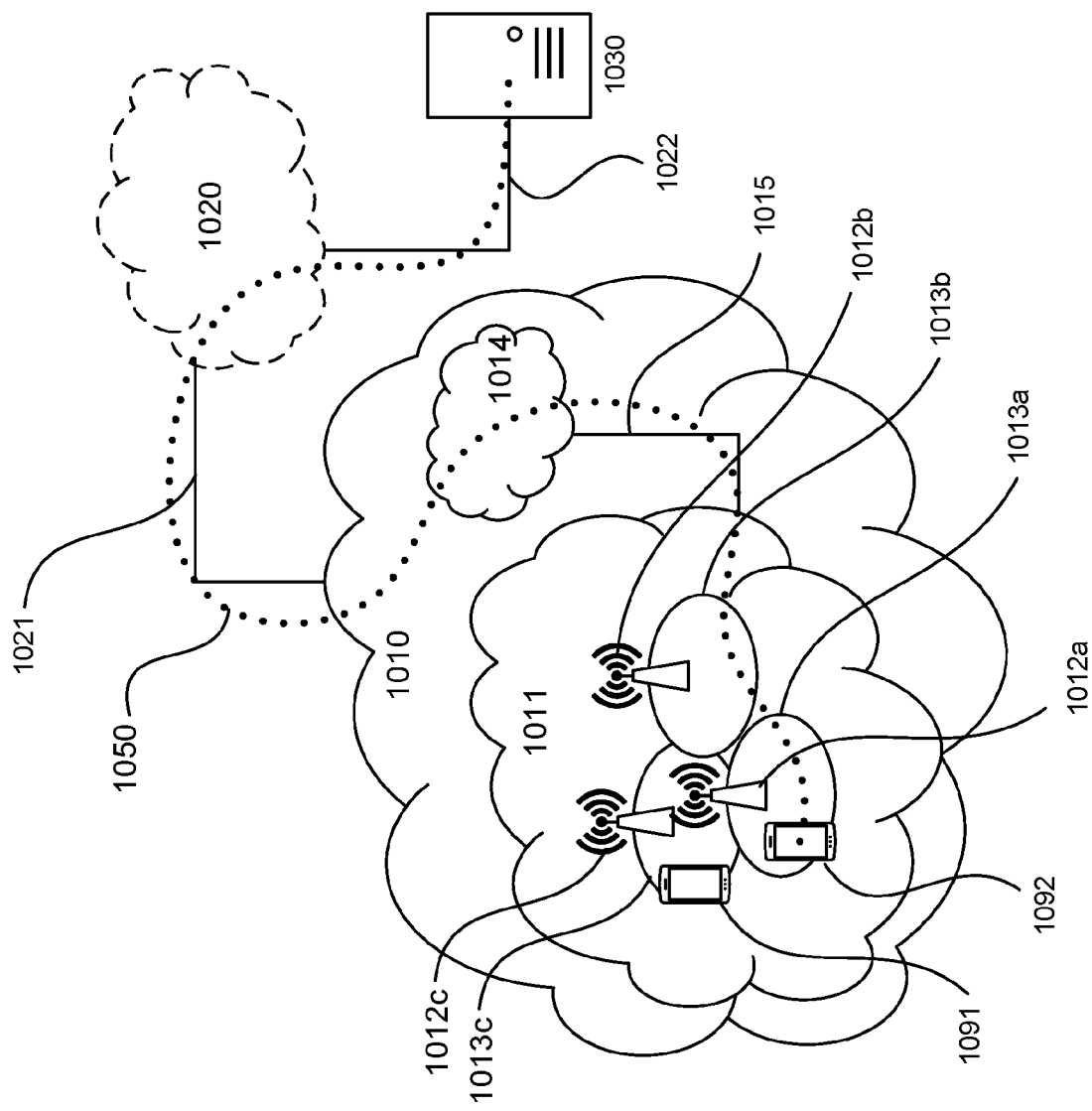
FIG. 10 is a block diagram of a communication network according to another embodiment.

As for further extensions and variations of the network-node and UE operations contemplated herein, FIG. 10 depicts an example communication system which includes telecommunication network 1010, such as a 3GPP-type cellular network, which comprises access network 1011, such as a radio access network, and a core network 1014. Access network 1011 comprises a plurality of base stations 1012a, 1012b, 1012c, e.g. the network node 110, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091, such as the UE 120, located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

While the foregoing base stations 1012*a,* 1012*b,* and 1012*c* are not depicted as being satellite-based, it shall be understood that the access network 1011 may be at least partly based on satellite-based radio links, e.g., one or more of the base stations 1012*a,* 1012*b,* and 1012*c* maybe satellite-based radio nodes. Further, one or both of the UEs 1091 and 1092 may be understood as a further example of the UE 120 described earlier herein, and, correspondingly, the telecommunication network 1010 includes one or more network nodes 110 as described earlier herein, e.g., integrated in one or more of the base stations 1012*a,* 1012*b,* and 1012*c,* or otherwise implemented in or in conjunction with the ground connections between the network 1010 and its included satellites.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink (UL) and downlink (DL) communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 13) served by base station 1120. Communication interface 1126 may be configured to facilitate connection 1160 to host computer 1110. Connection 1160 may be direct or it may pass through a core network (not shown in FIG. 13) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to above, and its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
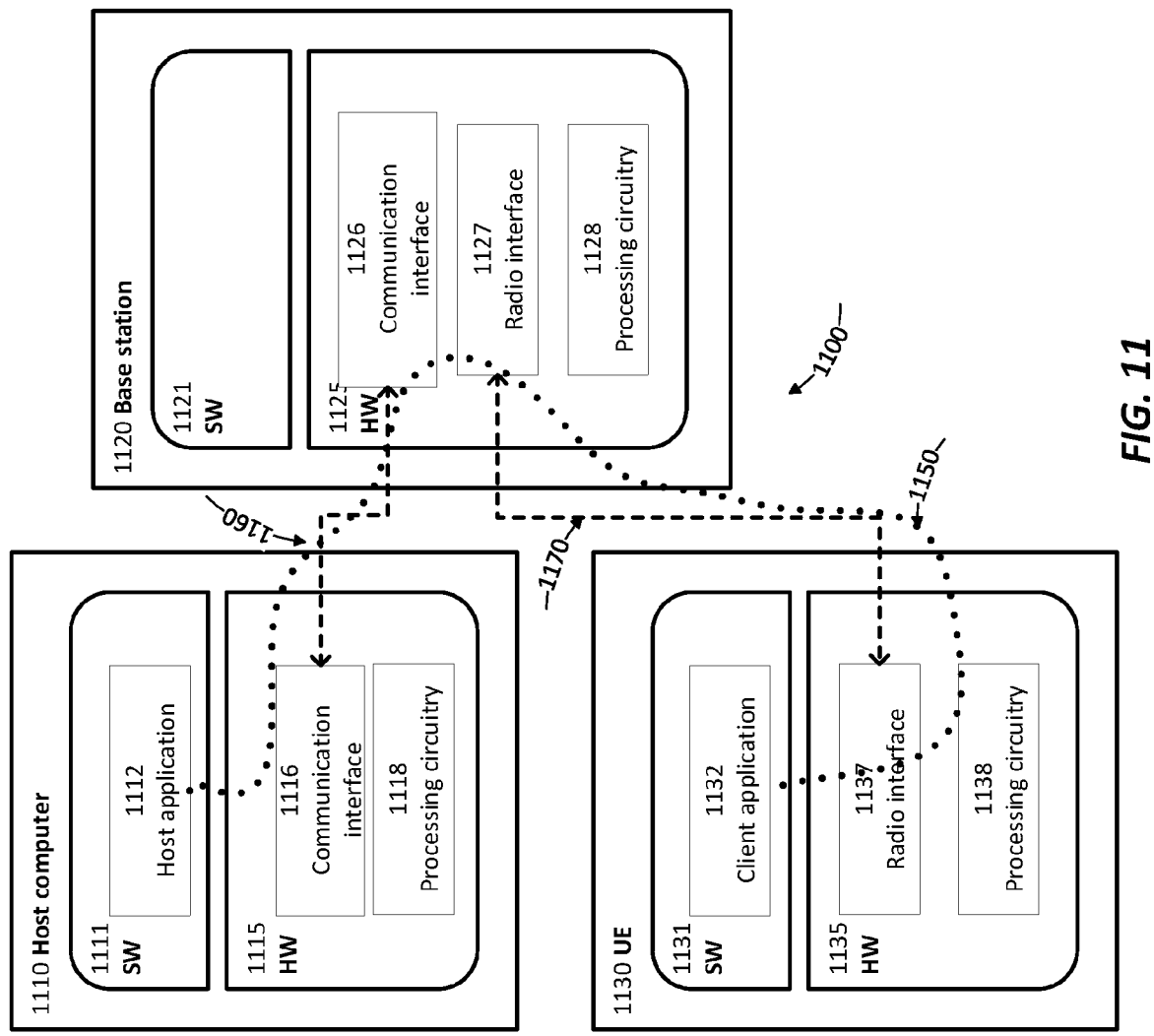
FIG. 11 is a block diagram of example implementation details for a UE, a base station, and a host computer, such as seen in FIG. 10.

It is noted that host computer 1110, base station 1120 and UE 1130 illustrated in FIG. 11 may be similar or identical to host computer 1030, one of base stations 1012*a,* 1012*b,* 1012*c* and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may reduce the RA latency and thereby provide benefits such as improved performance of the communications network, in particular when transmitting infrequent small data packets.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

FIG. 12 is a flowchart illustrating a method 1200 implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In sub step 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 13 is a flowchart illustrating a method 1300 implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method 1300, the host computer provides user data. In an optional sub step (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

FIG. 14 is a flowchart illustrating a method 1400 implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally, or alternatively, in step 1420, the UE provides user data. In sub step 1421 (which may be optional) of step 1420, the UE provides the user data by executing a client application. In sub step 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in sub step 1430 (which may be optional), transmission of the user data to the host computer. In step 1440 of the method 1400, the host computer receives the user data transmitted from the UE, in accordance with the teachings of the embodiments described throughout this disclosure.

FIG. 15 is a flowchart illustrating a method 1500 implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

FURTHE EXAMPLE EMBODIMENTS

Embodiment 1. A method, performed by a UE 120, for handling measurements, such as, e.g., RRC measurements, with respect to a moving RAN 104 of a communication network 100, the method comprising:
- obtaining information relating to a change of gateways 108 due to the moving RAN 104,
- determining, based on the obtained information, that an interruption of measurements performed by the UE 120 will occur, and
- adapting the measurements, based on the determined interruption,
- wherein the moving RAN 104 "moves" in the sense that one or more radio access nodes used to provide radio connectivity to UEs physically move, e.g., the moving radio access nodes are satellites 106.

Embodiment 2. The method according to Embodiment 1, wherein the information relating to the change of gateways 108 due to the moving RAN 104 comprises switch information indicating when the change of gateway will occur, and/or information on expected path loss change due to the change of gateway, and/or quantity configuration, and/or a report configuration indicating how/when the UE 120 shall report measurements to the RAN 104, and/or a predefined switch-list indicating when a specific change of gateways 108 will occur.

Embodiment 3. The method according to Embodiment 1 or 2, wherein the step of adapting the measurements comprises:
- stopping Layer 1 (L1) and/or Layer 3 (L3) filtering of a beam or a cell quality, with respect to the determined interruption.

Embodiment 4. The method according to any of the Embodiments 1 to 3, wherein the step of adapting the measurements comprises:
- discarding filtered measurements if the filtering periodic is shorter than a configured or fixed time.

Embodiment 5. The method according to any of the previous Embodiments, wherein the step of adapting the measurement comprises:
- combining beam or cell level filtering according to the obtained information, such as, e.g., a measurement configuration.

Embodiment 6. The method according to any of the previous Embodiments 1 to 5, wherein the information is obtained from a network node 110.

Embodiment 7. A computer program comprising instructions, which when executed by a processor of the UE 120, causes the UE 120 to perform actions according to any of the Embodiments 1-6.

Embodiment 8. A carrier comprising the computer program of Embodiment 7, wherein the carrier is one of an electronic signal, an optical signal, an electromagnetic signal, a magnetic signal, an electric signal, a radio signal, a microwave signal, or a computer-readable storage medium.

Embodiment 9. A method performed by a network node 110 in a communication network 100, for handling measurements performed by a UE 120, such as, e.g., RRC measurements, with respect to a moving RAN 104 of the communication network 100, the method comprising:
- sending, to the UE 120, information relating to a change of gateways 108 due to the moving RAN 104,
- receiving, from the UE, a measurement report based on the sent information relating to the change of gateways 108 due to the moving RAN 104.

Embodiment 10. The method according to Embodiment 9, wherein the information relating to the change of gateways 108 comprises switch information indicating when the change of gateways 108 will occur, and/or information on expected path loss change due to the change of gateways 108, and/or quantity configuration, and/or a report configuration indicating how/when the UE 120 shall report measurements to the RAN, and/or a predefined switch-list indicating when a specific change of gateways 108 will occur.

Embodiment 11. A computer program comprising instructions, which when executed by a processor of the network node 110, causes the network node 110 to perform actions according to any of the Embodiments 9-10.

Embodiment 12. A carrier comprising the computer program of Embodiment 11, wherein the carrier is one of an electronic signal, an optical signal, an electromagnetic signal, a magnetic signal, an electric signal, a radio signal, a microwave signal, or a computer-readable storage medium.

Embodiment 13. A UE 120, for handling measurements, such as, e.g., RRC measurements, with respect to a moving RAN 104 of a communication network 100, wherein the UE 120 is configured to:
- obtain information relating to a change of gateways 108 due to the moving RAN 104,
- determine, based on the obtained information, that an interruption of the measurements will occur, and
- adapt the measurements based on the determined interruption.

Embodiment 14. The UE 120 according to Embodiment 13, wherein, to adapt the measurements, the UE 120 is configured to:
- stop Layer 1 (L1) and/or Layer 3 (L3) filtering of a beam or a cell quality, with respect to the determined interruption.

Embodiment 15. The method according to Embodiment 13 or 14, wherein, to adapt the measurements, the UE 120 is configured to:
- discard filtered measurements if the filtering periodic is shorter than a configured or fixed time.

Embodiment 16. The UE 120 according to any of the Embodiments 13 to 14, wherein, to adapt the measurements, the UE 120 is configured to:
- combine beam or cell level filtering according to the obtained information, such as, e.g., a measurement configuration.

Embodiment 19. The UE 120 according to any of the Embodiments 15 to 18, wherein the UE 120 is configured to:
obtain the information from a network node 110 of the communication network 100.

Embodiment 20. A network node 110 of a communication network, such as e.g. an eNB or an gNB, for handling measurements made by a UE 120, such as, e.g., RRC measurements, with respect to a moving RAN 104 of the network 100, the network node 110 being configured to:
send, to the UE 120, information relating to a change of gateways 108 due to the moving RAN 104,
receive, from the UE 120, a measurement report based on the sent information relating to the change of gateways 108 due to the moving RAN 104.

What is claimed is:

1. A method of operation by a network node of a wireless communication network comprising a Core Network (CN) and a satellite-based Radio Access Network (RAN) for communicatively coupling User Equipments (UEs) to the CN, the method comprising:
determining switch information regarding a forthcoming link change with respect to providing connectivity between a UE and the CN via the satellite-based RAN, the forthcoming link change being at least one of a service-link change or a feeder-link change arising from satellite movement, and the switch information indicating when the link change will occur;
sending the switch information to the UE, to control performance by the UE of Radio Resource Management (RRM) measurements with respect to the link change;
the UE having a current measurement configuration that is valid until the link change and governs the performance of RRM measurements by the UE in advance of the link change; and
sending a new measurement configuration one of in and in conjunction with the switch information, the new measurement configuration being valid after the link change and governing the performance of RRM measurements by the UE after the link change.

2. The method of claim 1, wherein the new measurement configuration includes one or more measurement objects and one or more measurement object identifiers corresponding to one or more service links applicable to the UE after the link change.

3. The method of claim 1, wherein the switch information indicates that the UE shall suspend the performance of RRM measurements during an interval in which the link change occurs.

4. The method of claim 1, wherein the switch information indicates a measurement filtering configuration to be used by the UE for the performance of RRM measurements after the link change.

5. The method of claim 1, wherein the switch information indicates whether the UE shall combine RRM measurements acquired by the UE in advance of the link change with RRM measurements acquired by the UE after the link change.

6. The method of claim 1, wherein the switch information indicates when the link change will occur using one of an absolute time value and a relative time value.

7. The method of claim 6, wherein, when the relative time value is used, the relative time value is expressed in terms of a system frame timing used for synchronous transmission to and reception from the UE.

8. The method of claim 1, wherein the satellite-based RAN comprises a number of satellite-based transponders operative for relaying radio signals between the UE and one or more ground-based radio access nodes, and wherein the link change comprises a feeder-link change for a satellite-based transponder that is currently serving the UE, and wherein the method includes sending, one of in and in conjunction with the switch information, information indicating an expected change in path loss associated with the feeder-link change.

9. A method of operation by a User Equipment (UE) with respect to a wireless communication network comprising a Core Network (CN) and a satellite-based Radio Access Network (RAN) for communicatively coupling UEs to the CN, the method comprising:
receiving switch information from the wireless communication network regarding a forthcoming link change with respect to providing connectivity between the UE and the CN via the satellite-based RAN, the forthcoming link change being at least one of a service-link change or a feeder-link change arising from satellite movement, and the switch information indicating when the link change will occur; and
performing Radio Resource Management measurements in dependence on the switch information, including adapting the performance of RRM measurements at a time indicated by the switch information, adapting the performance of RRM measurements at the time indicated by the switch information comprising changing from a current measurement configuration to a new measurement configuration at the time indicated by the switch information, the UE receiving the new measurement configuration one of in and in conjunction with the switch information, the current measurement configuration governing performance of RRM measurements by the UE in advance of the link change, and the new measurement configuration governing performance of RRM measurements by the UE after the link change.

10. The method of claim 9, wherein the new measurement configuration includes one or more measurement objects and one or more measurement object identifiers corresponding to one or more service links applicable to the UE after the link change.

11. The method of claim 9, wherein the switch information indicates that the UE shall suspend the performance of RRM measurements during an interval in which the link change occurs, and wherein adapting the performance of RRM measurements at the time indicated by the switch information comprises suspending the performance of RRM measurements during the interval.

12. The method of claim 9, wherein the switch information indicates a measurement filtering configuration to be used by the UE for the performance of RRM measurements after the link change, and wherein adapting the performance of RRM measurements at the time indicated by the switch information comprises adapting measurement filtering used by the UE for filtering RRM measurements in accordance with the measurement filtering configuration indicated by the switch information.

13. The method of claim 9, wherein the switch information indicates whether the UE shall combine RRM measurements acquired by the UE in advance of the link change with RRM measurements acquired by the UE after the link change, and wherein adapting the performance of RRM measurements at the time indicated by the switch information includes, in dependence on the switch information, one of combining and not combining RRM measurements made in advance of the time indicated by the switch information with RRM measurements made after the time indicated by the switch information.

14. The method of claim 9, wherein the switch information indicates when the link change will occur using one of an absolute time value and a relative time value.

15. The method of claim 14, wherein, when the relative time value is used, the relative time value is expressed in terms of a system frame timing used for synchronous transmission to and reception from the UE.

16. The method of claim 9, wherein the satellite-based RAN comprises a number of satellite-based transponders operative for relaying radio signals between the UE and one or more ground-based radio access nodes, and wherein the link change comprises a feeder-link change for a satellite-based transponder that is currently serving the UE, and wherein the method includes the UE receiving, one of in and in conjunction with the switch information, information indicating an expected change in path loss associated with the feeder-link change, and, correspondingly, adjusting a power of one or more uplink transmissions by the UE, to account for the expected change in path loss.

17. A network node configured for operation in a wireless communication network, the communication network comprising a Core Network (CN) and a satellite-based Radio Access Network (RAN) for communicatively coupling User Equipments (UEs) to the CN, the network node comprising:
communication circuitry configured to communicatively couple the network node to a UE via the satellite-based RAN; and
processing circuitry operatively associated with the communication circuitry and configured to:
determine switch information regarding a forthcoming link change with respect to providing connectivity between the UE and the CN via the satellite-based RAN, the forthcoming link change being at least one of a service-link change or a feeder-link change arising from satellite movement, and the switch information indicating when the link change will occur;
send the switch information to the UE, to control performance by the UE of Radio Resource Management (RRM) measurements with respect to the link change;

the UE having a current measurement configuration that is valid until the link change and governs the performance of RRM measurements by the UE in advance of the link change; and
send a new measurement configuration one of in and in conjunction with the switch information, the new measurement configuration being valid after the link change and governing the performance of RRM measurements by the UE after the link change.

18. A User Equipment (UE) configured for operation in a wireless communication network, the wireless communication network comprising a Core Network (CN) and a satellite-based Radio Access Network (RAN) for communicatively coupling UEs to the CN, the UE comprising:
communication circuitry configured to send signaling to and receive signaling from the satellite-based RAN; and
processing circuitry operatively associated with the communication circuitry and configured to:
receive switch information from the wireless communication network, regarding a forthcoming link change with respect to providing connectivity between the UE and the CN via the satellite-based RAN, the forthcoming link change being at least one of a service-link change or a feeder-link change arising from satellite movement, and the switch information indicating when the link change will occur; and
perform Radio Resource Management (RRM) measurements in dependence on the switch information, including adapting the performance of RRM measurements at a time indicated by the switch information, adapting the performance of RRM measurements at the time indicated by the switch information comprising changing from a current measurement configuration to a new measurement configuration at the time indicated by the switch information, the UE receiving the new measurement configuration one of in and in conjunction with the switch information, the current measurement configuration governing performance of RRM measurements by the UE in advance of the link change, and the new measurement configuration governing performance of RRM measurements by the UE after the link change.

* * * * *